(12) United States Patent
Watanabe et al.

(10) Patent No.: US 11,204,336 B2
(45) Date of Patent: Dec. 21, 2021

(54) SENSOR ELEMENT AND GAS SENSOR

(71) Applicant: NGK INSULATORS, LTD., Nagoya (JP)

(72) Inventors: Atsushi Watanabe, Kasugai (JP); Takashi Suzuki, Ikoma (JP); Shuichi Ozawa, Nagoya (JP); Hirohito Kiyota, Nagoya (JP); Satoko Moriyama, Komaki (JP); Shiho Iwai, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 167 days.

(21) Appl. No.: 15/469,852

(22) Filed: Mar. 27, 2017

(65) Prior Publication Data
US 2017/0284958 A1  Oct. 5, 2017

(30) Foreign Application Priority Data

Mar. 30, 2016 (JP) .............................. JP2016-068394
Mar. 24, 2017 (JP) .............................. JP2017-058596

(51) Int. Cl.
*G01N 27/407* (2006.01)
*G01N 27/406* (2006.01)

(52) U.S. Cl.
CPC ..... *G01N 27/4077* (2013.01); *G01N 27/4074* (2013.01); *G01N 27/406* (2013.01); *G01N 27/4071* (2013.01)

(58) Field of Classification Search
CPC ........... G01N 27/4077; G01N 27/4074; G01N 27/406; G01N 27/4067; G01N 27/409; G01N 27/41; G01N 27/4114; G01N 27/4118; G01N 27/417; G01N 27/419; G01N 27/407–4078
See application file for complete search history.

(56) References Cited

U.S. PATENT DOCUMENTS

2003/0159928 A1* 8/2003 Kojima .............. G01N 27/4067 204/408
2007/0245803 A1* 10/2007 Tan .................... G01N 27/4077 73/31.05

(Continued)

FOREIGN PATENT DOCUMENTS

JP  2003279528 A  † 10/2003
JP  2012-173146 A  9/2012

(Continued)

OTHER PUBLICATIONS

Notice of Reasons for Refusal for the corresponding Japanese application No. 2017-058596, dated Sep. 29, 2020.

*Primary Examiner* — James Lin
*Assistant Examiner* — Vivian A Tran
(74) *Attorney, Agent, or Firm* — Global IP Counselors, LLP

(57) ABSTRACT

A sensor element 101 includes an element main body 101a that includes oxygen ion-conductive solid electrolyte layers (1 to 6), and a porous protective layer 90 that covers at least part of the element main body 101a. The porous protective layer 90 includes a porous inner protective layer 92 and a porous outer protective layer 91 disposed on the outer side of the inner protective layer 92 and having a smaller average pore diameter than the inner protective layer 92.

19 Claims, 4 Drawing Sheets

(56) References Cited

U.S. PATENT DOCUMENTS

| | | | | |
|---|---|---|---|---|
| 2009/0242403 A1* | 10/2009 | Suzuki | ............... | G01N 27/4071 |
| | | | | 204/431 |
| 2013/0104625 A1* | 5/2013 | Otsuka | ............... | G01N 27/4077 |
| | | | | 73/23.31 |
| 2015/0060274 A1* | 3/2015 | Ishikawa | ............... | G01N 27/409 |
| | | | | 204/424 |
| 2015/0075254 A1* | 3/2015 | Sakuma | ............... | G01M 15/104 |
| | | | | 73/23.31 |
| 2015/0268187 A1 | 9/2015 | Adachi et al. | | |
| 2016/0061767 A1* | 3/2016 | Peters | ................ | G01N 27/4074 |
| | | | | 204/424 |
| 2016/0370312 A1 | 12/2016 | Adachi et al. | | |

FOREIGN PATENT DOCUMENTS

| | | | | |
|---|---|---|---|---|
| JP | 2012173146 A | † | 9/2012 | |
| JP | 2012-220293 A | | 11/2012 | |
| JP | 2013096792 A | * | 5/2013 | ......... G01N 27/4077 |
| JP | 2015-59758 A | | 3/2015 | |
| JP | 2015-72259 A | | 4/2015 | |
| JP | 2015-178988 A | | 10/2015 | |

\* cited by examiner
† cited by third party

SENSOR ELEMENT AND GAS SENSOR

BACKGROUND OF THE INVENTION

1. Field of the Invention

The present invention relates to a sensor element and a gas sensor.

2. Description of the Related Art

To date, gas sensors including sensor elements for detecting the concentrations of predetermined gases, e.g., NOx, in gases to be measured, such as automobile exhaust gases, are known. It is also known that a porous protective layer is formed on the surface of the sensor element in such a gas sensor. For example, PTL 1 describes forming a porous protective layer by immersing (dipping) a sensor element in a slurry containing heat-resistant particles, such as alumina, to form a coating film on the sensor element, and firing the coating film. It is described that formation of the porous protective layer can suppress cracking of the sensor element caused by adhesion of moisture, for example.

CITATION LIST

Patent Literature

PTL 1: JP 2012-220293 A

SUMMARY OF THE INVENTION

The temperature in the operation of the sensor element of such a gas sensor is usually high (for example, 800° C.), and it is desirable that cracking of the sensor element due to rapid cooling caused by adhesion of moisture be further suppressed.

The present invention has been made to resolve such issues, and a main object is to improve the waterproofing performance of the element main body of the sensor element.

In the present invention, the following measures are adopted so as to achieve the above-described main object.

A sensor element according to the present invention includes:

an element main body including an oxygen ion-conductive solid electrolyte layer; and a protective layer covering at least part of the element main body and including a porous inner protective layer and a porous outer protective layer disposed on an outer side of the inner protective layer, the outer protective layer having a smaller average pore diameter than the inner protective layer.

In this sensor element, the outer protective layer has a smaller average pore diameter than the inner protective layer, and thus the capillary force of the pores of the outer protective layer is larger than that of the pores of the inner protective layer. In other words, the value of the ratio $R1/R2$ of the average pore diameter $R1$ [μm] of the outer protective layer to the average pore diameter $R2$ [μm] of the inner protective layer is less than 1.0. As a result, the moisture adhered to the surface of the protective layer spreads into the outer protective layer, is easily retained in the outer protective layer, and does not easily reach the inner protective layer. Thus, water rarely reaches the element main body, cooling of the outer side of the element main body is suppressed, and the temperature gradient between the inner side of the element main body and the outer side of the element main body becomes more gentle. Thus, the waterproofing performance of the element main body of the sensor element is improved.

In the sensor element according to the present invention, the value of the ratio $R1/R2$ of the average pore diameter $R1$ [m] of the outer protective layer to the average pore diameter $R2$ [μm] of the inner protective layer may be 0.8 or less. At this value, the outer protective layer more easily retains the moisture, and thus the waterproofing performance of the element main body is further improved. The value of the ratio $R1/R2$ is more preferably 0.4 or less and yet more preferably 0.1 or less. The value of the ratio $R1/R2$ may be 0.01 or more or 0.02 or more. The upper limit and the lower limit of the ratio $R1/R2$ described above may be used in any combination. The average pore diameter $R1$ may be 0.5 μm or more. The average pore diameter $R1$ may be 40 μm or less. The average pore diameter $R2$ may be 5 μm or more. The average pore diameter $R2$ may be 100 μm or less.

In the sensor element according to the present invention, the value of the ratio $D90/D10$ of the 90% pore diameter (D90) [μm] of the outer protective layer to the 10% pore diameter (D10) [μm] of the inner protective layer may be 2.0 or less. At this value, the outer protective layer not only has a small average pore diameter but also has a pore diameter distribution that tends to have fewer large-diameter pores. Moreover, the inner protective layer not only has a large average pore diameter but also has a pore diameter distribution that tends to have fewer small-diameter pores. Thus, the outer protective layer more easily retains the moisture, it becomes more difficult for the moisture to reach the inner protective layer, and the waterproofing performance of the element main body is further improved. The value of the ratio $D90/D10$ is more preferably 1.5 or less, yet more preferably 1.0 or less, and most preferably 0.5 or less. The value of the ratio $D90/D10$ may be 0.1 or more. D90 may be 100 μm or less or 60 μm or less. D90 may be 1 μm or more or 2 μm or more. D10 may be 1 μm or more or 5 μm or more. D10 may be 50 μm or less or 40 μm or less. The value of the ratio $D90/R1$ of the D90 of the outer protective layer to the average pore diameter $R1$ is preferably 4 or less, more preferably 2 or less, and yet more preferably 1.5 or less. The value of the ratio $D90/R1$ may be 1 or more or 1.2 or more. The value of the ratio $D10/R2$ of D10 of the inner protective layer to the average pore diameter $R2$ is preferably 0.1 or more, more preferably 0.2 or more, and yet more preferably 0.5 or more. The value of the ratio $D10/R2$ may be 1 or less or 0.8 or less. The upper limit and the lower limit of the ratio $D90/D10$ described above can be used in any combination. Similarly, the upper limit and the lower limit of D90 described above can be used in any combination. The upper limit and the lower limit of D10 described above can be used in any combination. The upper limit and the lower limit of the ratio $D90/R1$ described above can be used in any combination. The upper limit and the lower limit of the ratio $D10/R2$ described above can be used in any combination.

In the sensor element according to the present invention, the value of the ratio $T1/T2$ of the thickness $T1$ [μm] of the outer protective layer to the thickness $T2$ [μm] of the inner protective layer may be 30.0 or less.

In the sensor element according to the present invention, the value of the ratio $T1/T2$ of the thickness $T1$ [μm] of the outer protective layer to the thickness $T2$ [μm] of the inner protective layer may be 1.0 or less. At this value, because the thickness $T2$ of the inner protective layer is relatively large, the distance between the element main body and the outer protective layer can be made relatively large. Thus, for example, water in the outer protective layer does not easily reach the element main body, and the outer protective layer and the element main body are heat-insulated by the inner protective layer. Therefore, cooling of the outer side of the element main body is suppressed, and the waterproofing performance of the element main body of the sensor element is further improved. The value of the ratio T1/T2 is more preferably 0.6 or less and yet more preferably 0.2 or less. The value of the ratio T1/T2 may be 0.1 or more. The thickness T1 may be 30 μm or more or 50 μm or more. The thickness T1 may be 300 μm or less, or 200 μm or less, 150 μm or less, or 100 μm or less. The thickness T2 may be 170 μm or more, 200 μm or more, or 250 μm or more. The thickness T2 may be 400 μm or less. The thickness of the protective layer may be 270 μm or more or 700 μm or less. The upper limit and the lower limit of the ratio T1/T2 described above can be used in any combination. Similarly, the upper limit and the lower limit of the thickness T1 described above can be used in any combination. The upper limit and the lower limit of the thickness T2 described above can be used in any combination.

In the sensor element according to the present invention, the porosity P1 of the outer protective layer may be 10% or more and 60% or less, and the porosity P2 of the inner protective layer may be 20% or more and 70% or less. At a porosity P1 of 10% or more, deficiency of the pore volume inside the outer protective layer with respect to the amount of moisture does not easily occur, and the outer protective layer easily sufficiently retains the moisture. At a porosity P1 of 60% or less, the moisture does not easily pass through the outer protective layer, and the outer protective layer easily sufficiently retains the moisture. When the porosity P2 is 20% or more, deficiency of the heat-insulating effect between the outer protective layer and the element main body can be suppressed. At a porosity P2 of 70% or less, deficiency of the strength of the inner protective layer can be suppressed. The value of the ratio P1/P2 is preferably less than 2, more preferably less than 1, and yet more preferably 0.5 or less. The value of the ratio P1/P2 may be 0.2 or more. The smaller the value of the ratio P1/P2, the easier for the outer protective layer to sufficiently retain the moisture and the easier the suppression of the deficiency of the heat-insulating effect of the inner protective layer. Thus, the waterproofing performance of the element main body is further improved. The upper limit and the lower limit of the ratio P1/P2 described above can be used in any combination.

In the sensor element according to the present invention, the outer protective layer and the inner protective layer may be formed of a ceramic.

In the sensor element according to the present invention, the protective layer may include three or more layers that include the outer protective layer and the inner protective layer, the three or more layers being arranged to exhibit a tendency in which the average pore diameter increases from the outer protective layer toward the inner protective layer. In such a case, the protective layer may include one intermediate protective layer having an average pore diameter more than R1 and less than R2 disposed between the outer protective layer and the inner protective layer. Alternatively, the protective layer may include two or more intermediate protective layers having an average pore diameter more than R1 and less than R2 disposed between the outer protective layer and the inner protective layer and arranged to exhibit a tendency in which the average pore diameter increases from the outer protective layer side toward the inner protective layer side.

A gas sensor according to the present invention includes the sensor element according to any one of the aspects described above. Thus, the gas sensor can achieve the same effects as the sensor element according to the present invention, for example, an improvement in the waterproofing performance of the element main body of the sensor element.

DETAILED DESCRIPTION OF THE INVENTION

Figure 1:
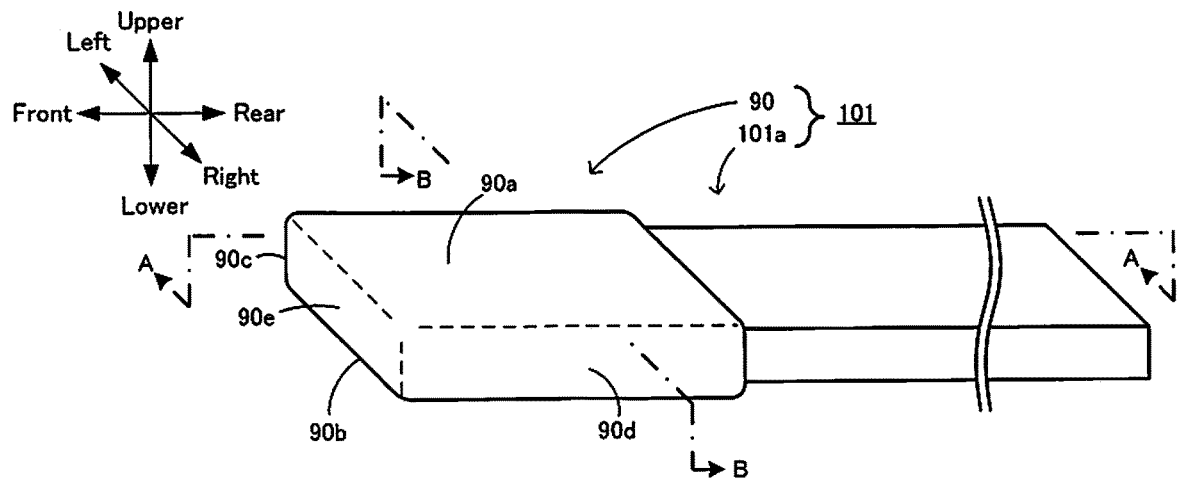
FIG. 1 is a schematic perspective view showing an example of a structure of a sensor element 101.
Figure 2:
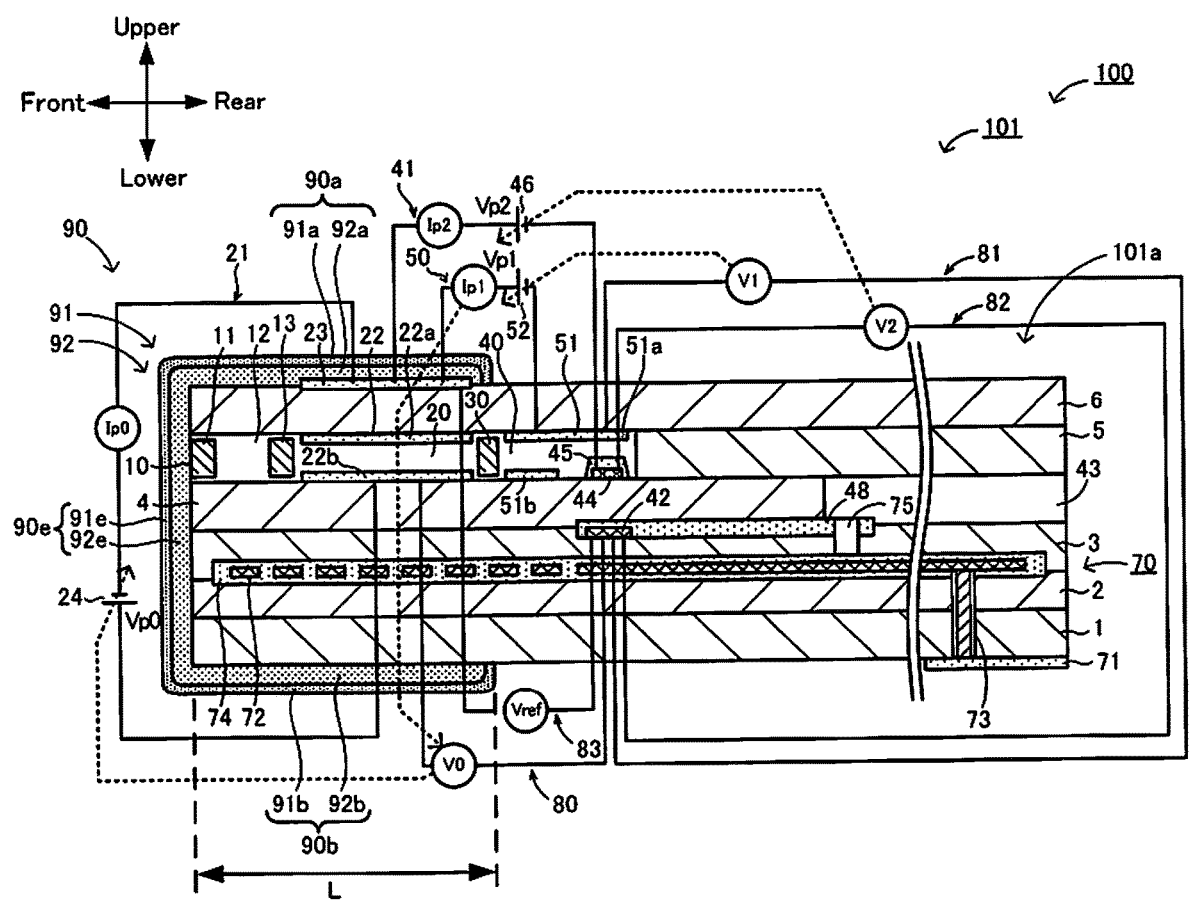
FIG. 2 is a schematic cross-sectional view showing an example of a structure of a gas sensor 100.
Figure 3:
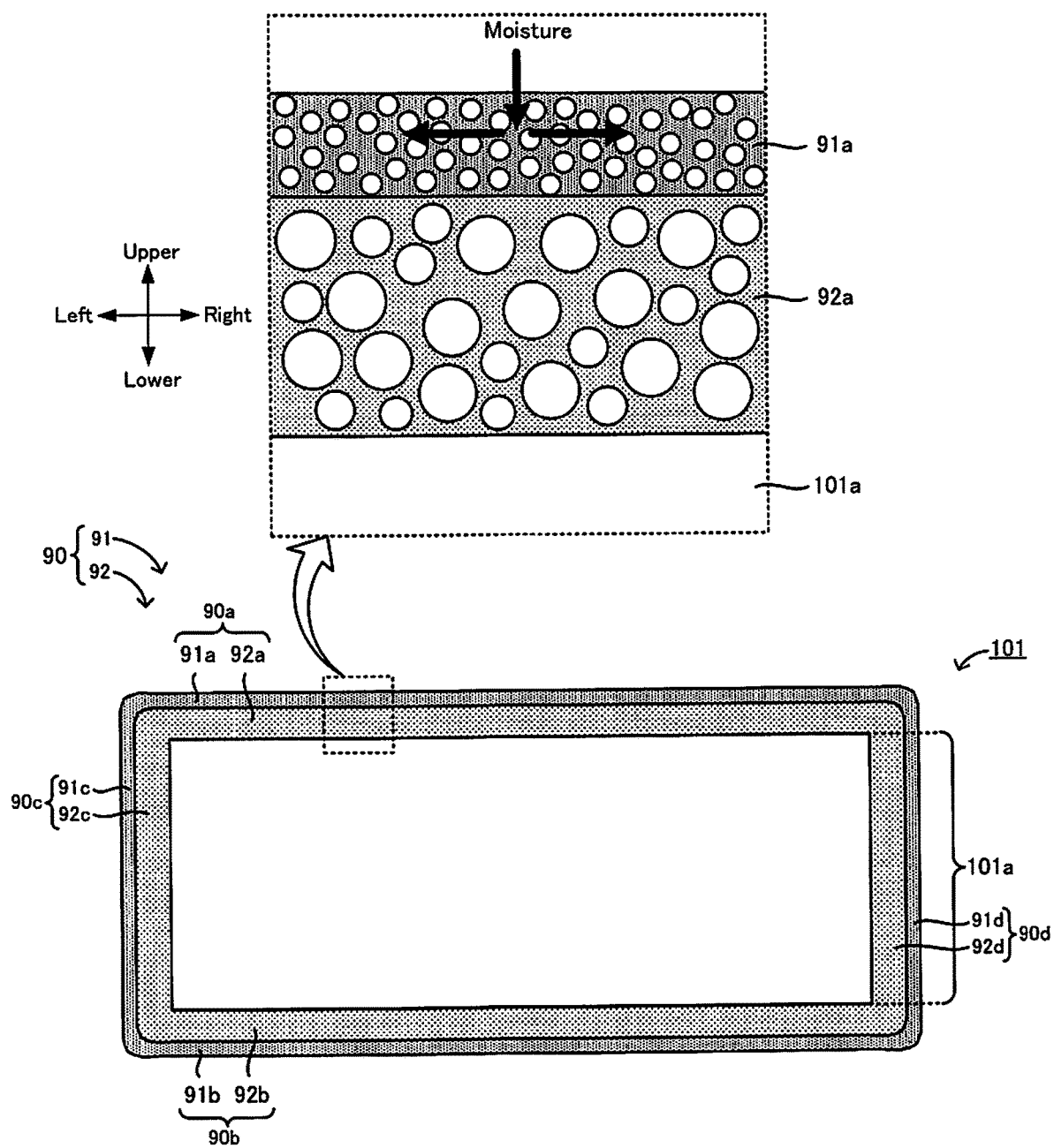
FIG. 3 is a cross-sectional view taken along B-B in FIG. 1.

Next, an embodiment according to the present invention are described with reference to the drawings. FIG. 1 is a schematic perspective view showing one example of a structure of a sensor element 101 according to one embodiment of the present invention. FIG. 2 is a schematic cross-sectional view showing one example of a structure of a gas sensor 100 that includes the sensor element 101. The cross-section of the sensor element 101 in FIG. 2 corresponds to an A-A section in FIG. 1. FIG. 3 a cross-sectional view taken along B-B in FIG. 1. The sensor element 101 has a shape of an elongated cuboid. The longitudinal direction (left/right direction in FIG. 2) of the sensor element 101 is assumed to be the front/rear direction, and the thickness direction (vertical direction in FIG. 2) of the sensor element 101 is assumed to be the vertical direction. The width direction (direction perpendicular to the front/rear direction and the vertical direction) of the sensor element 101 is assumed to be the left/right direction.

The gas sensor 100 is, for example, attached to a pipe, such as an exhaust pipe of a vehicle, and is used to measure the concentrations of specific gases, such as NOx and $O_2$, contained as the gases to be measured in the exhaust gas. In this embodiment, the gas sensor 100 is designed to measure the NOx concentration as the specific gas concentration. The sensor element 101 includes an element main body 101a and a porous protective layer 90 (corresponds to the protective layer according to the present invention) that covers the element main body 101a. The element main body 101a refers to the portion of the sensor element 101 other than the porous protective layer 90.

As illustrated in FIG. 2, the sensor element 101 is an element having a structure in which six layers composed of a first substrate layer 1, a second substrate layer 2, a third substrate layer 3, a first solid electrolyte layer 4, a spacer layer 5, and a second solid electrolyte layer 6, each being formed from an oxygen ion-conductive solid electrolyte layer of zirconia ($ZrO_2$) or the like, are stacked in that order from the bottom side in FIG. 2. Also, the solid electrolyte constituting these six layers is dense and airtight. The above-described sensor element 101 is produced by, for example, subjecting ceramic green sheets corresponding to the individual layers to predetermined processing, printing of circuit patterns, and the like, stacking them thereafter, and further performing firing so as to integrate the ceramic green sheets.

In one front end portion (frontward end portion) of the sensor element 101 and between the lower surface of the second solid electrolyte layer 6 and the upper surface of the first solid electrolyte layer 4, a gas inlet 10, a first diffusion-controlled portion 11, a buffer space 12, a second diffusion-controlled portion 13, a first internal space 20, a third diffusion-controlled portion 30, and a second internal space 40 are formed in that order so as to adjoin and communicate.

The gas inlet 10, the buffer space 12, the first internal space 20, and the second internal space 40 are spaces in the inside of the sensor element 101 by hollowing the spacer layer 5, where the upper portion is defined by the lower surface of the second solid electrolyte layer 6, the lower portion is defined by the upper surface of the first solid electrolyte layer 4, and the side portions are defined by the side surfaces of the spacer layer 5.

Each of the first diffusion-controlled portion 11, the second diffusion-controlled portion 13, and the third diffusion-controlled portion 30 is provided as two horizontally oriented (the longitudinal direction of the opening is a direction perpendicular to the drawing) slits. In this regard, the portions from the gas inlet 10 to the second internal space 40 may be referred to as a gas flow portion.

Meanwhile, at the position farther from the front end side than the gas flow portion, a reference gas introduction space 43 is provided at the location between the upper surface of the third substrate layer 3 and the lower surface of the spacer layer 5, where the side portions are defined by the side surfaces of the first solid electrolyte layer 4. For example, the air serving as the reference gas at the time of measurement of the NOx concentration is introduced into the reference gas introduction space 43.

An air introduction layer 48 is a layer composed of porous ceramics. The reference gas is introduced into the air introduction layer 48 through the gas introduction space 43. Also, the air introduction layer 48 is formed so as to cover a reference electrode 42.

The reference electrode 42 is an electrode formed so as to be sandwiched between the upper surface of the third substrate layer 3 and the first solid electrolyte layer 4 and, as described above, the air introduction layer 48 connected to the reference gas introduction space 43 is provided around the reference electrode 42. In addition, as described later, it is possible to measure the oxygen concentrations (oxygen partial pressures) in the first internal space 20 and the second internal space 40 by using the reference electrode 42.

In the gas flow portion, the gas inlet 10 is a part made open to the outside space, and the gas to be measured is taken from the outside space into the sensor element 101 through the gas inlet 10. The first diffusion-controlled portion 11 is a part for giving predetermined diffusion resistance to the gas to be measured, where the gas is taken from the gas inlet 10. The buffer space 12 is a space provided so as to lead the gas to be measured, where the gas is introduced from the first diffusion-controlled portion 11, to the second diffusion-controlled portion 13. The second diffusion-controlled portion 13 is a part for giving predetermined diffusion resistance to the gas to be measured, where the gas is introduced from the buffer space 12 to the first internal space 20. When the gas to be measured is introduced from the outside of the sensor element 101 into the first internal space 20, the gas to be measured, which is taken into the sensor element 101 through the gas inlet 10 rapidly because of the pressure fluctuation of the gas to be measured in the outside space (pulsation of an exhaust pressure in the case where the gas to be measured is an automotive exhaust gas), is not directly introduced into the first internal space 20 but introduced into the first internal space 20 after concentration variations of the gas to be measured are canceled through the first diffusion-controlled portion 11, the buffer space 12, and the second diffusion-controlled portion 13. Consequently, concentration variations of the gas to be measured, which is introduced into the first internal space 20, are made to be at an almost negligible level. The first internal space 20 is provided as a space for adjusting the oxygen partial pressure in the gas to be measured which is introduced through the second diffusion-controlled portion 13. The above-described oxygen partial pressure is adjusted by actuation of a main pump cell 21.

The main pump cell 21 is an electrochemical pump cell composed of an inside pump electrode 22 having a ceiling electrode portion 22a provided on an almost entire surface of the lower surface of the second solid electrolyte layer 6 facing the first internal space 20, an outside pump electrode 23 provided in a region, which corresponds to the ceiling electrode portion 22a, on the upper surface of the second solid electrolyte layer 6 so as to be exposed to the outside space, and the second solid electrolyte layer 6 sandwiched between these electrodes.

The inside pump electrode 22 is formed so as to extend over the upper and lower solid electrolyte layers (second solid electrolyte layer 6 and first solid electrolyte layer 4) defining the first internal space 20 and the spacer layer 5 providing the side walls. Specifically, the ceiling electrode portion 22a is formed on the lower surface of the second solid electrolyte layer 6 providing the ceiling surface of the first internal space 20 and a bottom electrode portion 22b is formed on the upper surface of the first solid electrolyte layer 4 providing the bottom surface. Then, side electrode portions (not shown in the drawing) are formed on the side wall surfaces (inner surfaces) of the spacer layer 5 constituting both side wall portions of the first internal space 20 so as to connect the ceiling electrode portion 22a to the bottom electrode portion 22b. Thus, the inside pump electrode 22 is disposed in the form of a tunnel-like structure in a zone where the side electrode portions are disposed.

The inside pump electrode 22 and the outside pump electrode 23 are formed as porous cermet electrodes (for example, a cermet electrode of Pt containing 1% of Au and ZrO2). In this regard, the inside pump electrode 22 to contact with the gas to be measured is formed by using a material having weakened ability to reduce NOx components in the gas to be measured.

In the main pump cell 21, oxygen in the first internal space 20 can be pumped out to the outside space or oxygen in the outside space can be pumped into the first internal space 20 by applying a predetermined pump voltage Vp0 between the inside pump electrode 22 and the outside pump electrode 23 and passing a pump current Ip0 between the inside pump electrode 22 and the outside pump electrode 23 in the positive direction or negative direction.

In addition, in order to detect the oxygen concentration (oxygen partial pressure) in the atmosphere in the first internal space 20, an electrochemical sensor cell, that is, a main pump controlling oxygen partial pressure detection sensor cell 80 is constructed by the inside pump electrode 22, the second solid electrolyte layer 6, the spacer layer 5, the first solid electrolyte layer 4, the third substrate layer 3, and the reference electrode 42.

The oxygen concentration (oxygen partial pressure) in the first internal space 20 is determined by measuring the electromotive force V0 of the main pump controlling oxygen partial pressure detection sensor cell 80. Further, the pump current Ip0 is controlled by feedback-controlling the pump voltage Vp0 of a variable power supply 24 so as to make the electromotive force V0 constant. Consequently, the oxygen concentration in the first internal space 20 can be maintained at a predetermined constant value.

The third diffusion-controlled portion 30 is a part which gives predetermined diffusion resistance to the gas to be measured, the oxygen concentration (oxygen partial pressure) of the gas having been controlled by the operation of the main pump cell 21 in the first internal space 20, and leads the gas to be measured into the second internal space 40.

The second internal space 40 is provided as a space for performing a treatment related to the measurement of the nitrogen oxide (NOx) concentration in the gas to be measured that is introduced through the third diffusion-controlled portion 30. The NOx concentration is measured mainly in the second internal space 40 in which the oxygen concentration is adjusted by an auxiliary pump cell 50 and further the NOx concentration is measured by the operation of a measurement pump cell 41.

In the second internal space 40, the gas to be measured is further subjected to adjustment of the oxygen partial pressure by the auxiliary pump cell 50, the gas to be measured having been subjected to adjustment of the oxygen concentration (oxygen partial pressure) in the first internal space 20 in advance and, thereafter, having been introduced through the third diffusion-controlled portion 30. Consequently, the oxygen concentration in the second internal space 40 can be maintained constant with high accuracy and, therefore, the gas sensor 100 can measure the NOx concentration with high accuracy.

The auxiliary pump cell 50 is an auxiliary electrochemical pump cell constructed by an auxiliary pump electrode 51 having a ceiling electrode portion 51a provided on an almost entire surface of the lower surface of the second solid electrolyte layer 6 facing the second internal space 40, an outside pump electrode 23 (not limited to the outside pump electrode 23, and the sensor element 101 and an appropriate outside electrode will suffice), and the second solid electrolyte layer 6.

The above-described auxiliary pump electrode 51 is arranged in the second internal space 40 so as to have a similar tunnel-like structure to the above-described inside pump electrode 22 disposed in the first internal space 20. That is, a tunnel-like structure is constructed, in which the ceiling electrode portion 51a is formed on the second solid electrolyte layer 6 providing the ceiling surface of the second internal space 40, a bottom electrode portion 51b is formed on the first solid electrolyte layer 4 providing the bottom surface of the second internal space 40, and then, side electrode portions (not shown in the drawing) for connecting the ceiling electrode portion 51a to the bottom electrode portion 51b are formed on both side wall surfaces of the spacer layer 5 providing side walls of the second internal space 40. In this regard, the auxiliary pump electrode 51 is formed by using a material having weakened ability to reduce NOx components in the gas to be measured in the same manner as the inside pump electrode 22.

In the auxiliary pump cell 50, oxygen in the atmosphere in the second internal space 40 can be pumped out to the outside space or oxygen in the outside space can be pumped into the second internal space 40 by applying a predetermined pump voltage Vp1 between the auxiliary pump electrode 51 and the outside pump electrode 23.

In addition, in order to control the oxygen partial pressure in the atmosphere in the second internal space 40, an electrochemical sensor cell, that is, an auxiliary pump controlling oxygen partial pressure detection sensor cell 81 is constructed by the auxiliary pump electrode 51, the reference electrode 42, the second solid electrolyte layer 6, the spacer layer 5, the first solid electrolyte layer 4, and the third substrate layer 3.

In this regard, the auxiliary pump cell 50 performs pumping by a variable power supply 52 which is voltage-controlled on the basis of the electromotive force V1 detected by the auxiliary pump controlling oxygen partial pressure detection sensor cell 81. Consequently, the oxygen partial pressure in the atmosphere in the second internal space 40 is controlled to a low partial pressure that does not substantially affect the measurement of NOx.

In addition to this, the pump current Ip1 thereof is used for controlling the electromotive force of the main pump controlling oxygen partial pressure detection sensor cell 80. Specifically, the pump current Ip1 serving as a control signal is input into the main pump controlling oxygen partial pressure detection sensor cell 80, and by controlling the electromotive force V0 thereof the gradient of the oxygen partial pressure in the gas to be measured, which is introduced from the third diffusion-controlled portion 30 into the second internal space 40, is controlled so as to be always constant. In the case of application as a NOx sensor, the oxygen concentration in the second internal space 40 is maintained at a constant value of about 0.001 ppm by the functions of the main pump cell 21 and the auxiliary pump cell 50.

The measurement pump cell 41 measures the NOx concentration in the gas to be measured in the second internal space 40. The measurement pump cell 41 is an electrochemical pump cell constructed by a measurement electrode 44 disposed on the upper surface of the first solid electrolyte layer 4 facing the second internal space 40 and at the position apart from the third diffusion-controlled portion 30, the outside pump electrode 23, the second solid electrolyte layer 6, the spacer layer 5, and the first solid electrolyte layer 4.

The measurement electrode 44 is a porous cermet electrode. The measurement electrode 44 also functions as a NOx reduction catalyst for reducing NOx present in the atmosphere in the second internal space 40. Further, the measurement electrode 44 is covered with a fourth diffusion-controlled portion 45.

The fourth diffusion-controlled portion 45 is a film composed of a ceramic porous body. The fourth diffusion-controlled portion 45 has a function of restricting the amount of NOx flowing into the measurement electrode 44 and, in addition, a function as a protective film for the measurement electrode 44. In the measurement pump cell 41, oxygen generated by decomposition of nitrogen oxides in the atmosphere around the measurement electrode 44 is pumped out and the amount of generation thereof can be detected as a pump current Ip2.

Also, in order to detect the oxygen partial pressure around the measurement electrode 44, an electrochemical sensor cell, that is, a measurement pump controlling oxygen partial pressure detection sensor cell 82 is constructed by the first solid electrolyte layer 4, the third substrate layer 3, the measurement electrode 44, and the reference electrode 42. A variable power supply 46 is controlled on the basis of the electromotive force V2 detected by the measurement pump controlling oxygen partial pressure detection sensor cell 82.

The gas to be measured, which is introduced into the second internal space 40, reaches the measurement electrode 44 through the fourth diffusion-controlled portion 45 under circumstances where the oxygen partial pressure is controlled. Nitrogen oxides in the gas to be measured around the measurement electrode 44 are reduced (2NO.N2+O2) and oxygen is generated. Then, the resulting oxygen is pumped by the measurement pump cell 41. At that time, the voltage Vp2 of the variable power supply 46 is controlled so as to make the control voltage V2 detected by the measurement pump controlling oxygen partial pressure detection sensor cell 82 constant. The amount of oxygen generated around the measurement electrode 44 is proportional to the concentration of the nitrogen oxides in the gas to be measured and, therefore, the nitrogen oxide concentration in the gas to be measured is calculated by using the pump current Ip2 in the measurement pump cell 41.

In addition, in the case where the measurement electrode 44, the first solid electrolyte layer 4, the third substrate layer 3, and the reference electrode 42 are combined so as to constitute an oxygen partial pressure detection device as an electrochemical sensor cell, the electromotive force in accordance with the difference between the amount of oxygen generated by reduction of NOx components in the atmosphere around the measurement electrode 44 and the amount of oxygen contained in the reference air can be detected and, thereby, the concentration of NOx components in the gas to be measured can be determined.

Further, an electrochemical sensor cell 83 is constructed by the second solid electrolyte layer 6, the spacer layer 5, the first solid electrolyte layer 4, the third substrate layer 3, the outside pump electrode 23, and the reference electrode 42. The oxygen partial pressure in the gas to be measured in the outside of the sensor can be detected by the electromotive force Vref obtained by the sensor cell 83.

In the gas sensor 100 having the above-described configuration, the gas to be measured, which has an oxygen partial pressure always maintained at a low constant value (value that does not substantially affect the measurement of NOx) by actuation of the main pump cell 21 and the auxiliary pump cell 50, is fed to the measurement pump cell 41. Therefore, the NOx concentration in the gas to be measured can be determined on the basis of the pump current Ip2 that flows because oxygen, which is generated by reduction of NOx nearly in proportion to the NOx concentration in the gas to be measured, is pumped out of the measurement pump cell 41.

Further, in order to enhance the oxygen ion conductivity of the solid electrolyte, the sensor element 101 includes a heater portion 70 having a function of adjusting the temperature including heating the sensor element 101 and keeping the temperature. The heater portion 70 includes a heater connector electrode 71, a heater 72, a through hole 73, a heater insulating layer 74, and a pressure release hole 75.

The heater connector electrode 71 is an electrode formed so as to contact with the lower surface of the first substrate layer 1. The electric power can be supplied from the outside to the heater portion 70 by connecting the heater connector electrode 71 to an external power supply.

The heater 72 is an electric resistor formed to be sandwiched between the second substrate layer 2 and the third substrate layer 3 in the vertical direction. The heater 72 is connected to the heater connector electrode 71 through the through hole 73 and generates heat by being supplied with an electric power from the outside through the heater connector electrode 71 so as to heat the solid electrolyte constituting the sensor element 101 and keep the temperature.

Also, the heater 72 is embedded over an entire range from the first internal space 20 to the second internal space 40 and the entirety of the sensor element 101 can be adjusted to have a temperature at which the above-described solid electrolyte is activated.

The heater insulating layer 74 is an insulating layer formed on the upper and lower surfaces of the heater 72 by using an insulator, e.g., alumina. The heater insulating layer 74 is formed for the purpose of establishing electrical insulation between the second substrate layer 2 and the heater 72 and electrical insulation between the third substrate layer 3 and the heater 72.

The pressure release hole 75 is a part provided so as to penetrate the third substrate layer 3 and communicate with the reference gas introduction space 43 and is formed for the purpose of reducing an internal pressure increase associated with a temperature increase in the heater insulating layer 74.

As illustrated in FIGS. 1 to 3, the element main body 101a has a portion covered with the porous protective layer 90. The porous protective layer 90 includes porous protective layers 90a to 90e respectively formed on five surfaces out of the six surfaces of the element main body 101a. The porous protective layer 90a covers part of an upper surface of the element main body 101a. The porous protective layer 90b covers part of a lower surface of the element main body 101a. The porous protective layer 90c covers part of a left surface of the element main body 101a. The porous protective layer 90d covers part of a right surface of the element main body 101a. The porous protective layer 90e covers the entire front end surface of the element main body 101a. The porous protective layers 90a to 90d completely cover a region that extends a distance L (refer to FIG. 2) from the front end surface of the element main body 101a toward the rear side among surfaces of the element main body 101a on which they are formed. The porous protective layer 90a also covers a portion where the outside pump electrode 23 is formed. The porous protective layer 90e also covers the gas inlet 10. Since the porous protective layer 90e is a porous body, the gas to be measured can pass through the interior of the porous protective layer 90e and can reach the gas inlet 10. The porous protective layer 90 covers a portion (portion extending a distance L from the front end surface of the element main body 101a and including the front end surface) of the element main body 101a to protect that portion. The porous protective layer 90 has a function of suppressing cracking of the element main body 101a caused by adhesion of moisture or the like in the gas to be measured, for example. The distance L is determined to be in the range of (0 distance L c length of element main body 101a in longitudinal direction) on the basis of the range of the element main body 101a to be exposed to the gas to be measured, the position of the outside pump electrode 23, etc., in the gas sensor 100.

Each of the porous protective layers 90a to 90e has a two-layer structure. The porous protective layer 90a includes a porous outer protective layer 91a and a porous inner protective layer 92a. The inner protective layer 92a covers part of the upper surface of the element main body 101a. The outer protective layer 91a is disposed on the outer side of the inner protective layer 92a (the side farther than the inner protective layer 92a when viewed from the element main body 101a) and is stacked on the upper side of the inner protective layer 92a. Similarly, the porous protective layer 90b includes an outer protective layer 91b and an inner protective layer 92b. The porous protective layer 90c includes an outer protective layer 91c and an inner protective layer 92c. The porous protective layer 90d includes an outer protective layer 91d and an inner protective layer 92d. The porous protective layer 90e includes an outer protective layer 91e and an inner protective layer 92e. Among the outer protective layers 91a to 91e, adjacent layers are connected to one another. The outer protective layers 91a to 91e are collectively referred to as an outer protective layer 91. Among the inner protective layers 92a to 92e, adjacent layers are connected to one another. The inner protective layers 92a to 92e are collectively referred to as an inner protective layer 92.

The porous protective layer 90 (outer protective layer 91 and inner protective layer 92) is a porous body and, for example, is formed of a ceramic that contains ceramic particles as constituent particles. Examples of the ceramic particles include particles of metal oxides such as alumina ($Al_2O_3$), zirconia ($ZrO_2$), spinel ($MgAl_2O_4$), and mullite ($Al_6O_{13}Si_2$). The porous protective layer 90 preferably contains at least one of these particles. In this embodiment, the porous protective layer 90 is formed of an alumina porous body.

The porous protective layer 90a includes the inner protective layer 92a and the outer protective layer 91a that is disposed on the outer side of the inner protective layer 92a and has a smaller average pore diameter than the inner protective layer 92a. In other words, the value of the ratio R1/R2 of the average pore diameter R1 [μm] of the outer protective layer 91a to the average pore diameter R2 of the inner protective layer 92a is less than 1.0. Although the details are described later, according to this configuration, the moisture adhering to the surface of the porous protective layer 90a is easily retained in the outer protective layer 91a and rarely reaches the inner protective layer 92a and the element main body 101a. Thus, cooling of the outer side of the element main body 101a (a portion in the upper side of the element main body 101a, such as the second solid electrolyte layer 6 in the element main body 101a) is suppressed, and the temperature gradient from the inner side of the element main body 101a to the outer side of the element main body 101a at the time water droplets are adhered becomes more gentle. As a result, the waterproofing performance of the element main body 101a is improved. Similarly, the porous protective layers 90b to 90e respectively include the inner protective layers 92b to 92e and the outer protective layers 91b to 91e that are disposed on the outer side of the inner protective layers 92b to 92e and have smaller average pore diameters than the inner protective layers 92b to 92e. In other words, in every one of the outer protective layers 90b to 90e, the value of the ratio R1/R2 of the average pore diameter R1 [μm] to the average pore diameter R2 is less than 1.0. As a result, as with the porous protective layer 90a, the moisture adhering to the surface of any of the porous protective layers 90b to 90e rarely reaches the element main body 101a, cooling of the outer side (the lower side, the left side, the right side, and the front side of the element main body 101a respectively corresponding to the porous protective layers 90b to 90e) of the element main body 101a is suppressed, and the temperature gradient from the inner side of the element main body 101a to the outer side of the element main body 101a at the time water droplets are adhered becomes more gentle. Thus, the waterproofing performance of the element main body 101a is improved. The average pore diameters R1 and R2 are both median diameters (D50). A median diameter (D50) is a pore diameter at which 50% of the pores are smaller in terms of a volume-based cumulative fraction in pore diameter distribution measurement.

In at least one of the porous protective layers 90a to 90e, the value of the ratio R1/R2 is preferably 0.8 or less. At this value, the outer protective layer 91 more easily retains the moisture, and thus the waterproofing performance of the element main body 101a is further improved. In at least one of the porous protective layers 90a to 90e, the value of the ratio R1/R2 is preferably 0.4 or less and more preferably 0.1 or less. In at least one of the porous protective layers 90a to 90e, the value of the ratio R1/R2 may be 0.01 or more or 0.02 or more. The upper limit and the lower limit of the ratio R1/R2 described above can be used in any combination. In at least one of the outer protective layers 91a to 91e, the average pore diameter R1 may be 0.5 μm or more and the average pore diameter R1 may be 40 μm or less. In at least one of the inner protective layers 92a to 92e, the average pore diameter R2 may be 5 μm or more and the average pore diameter R2 may be 100 μm or less.

In at least one of the porous protective layers 90a to 90e, the value of the ratio D90/D10 of the 90% pore diameter (D90) [μm] of the outer protective layer 91 to the 10% pore diameter (D10) [μm] of the inner protective layer 92 is preferably 2.0 or less. At this value, the outer protective layer 91 more easily retains moisture, it becomes more difficult for the moisture to reach the inner protective layer 92, and the waterproofing performance of the element main body 101a is further improved. As with the ratio R1/R2, the value of the ratio D90/D10 is a value derived based on the outer protective layer and the inner protective layer included in each of the porous protective layers 90a to 90e. For example, the ratio D90/D10 in the porous protective layer 90a is derived on the basis of the D90 of the outer protective layer 91a and the D10 of the inner protective layer 92a. The 90% pore diameter (D90) is a pore diameter at which 90% of the pores are smaller in terms of a volume-based cumulative fraction in pore diameter distribution measurement. The 10% pore diameter (D10) is a pore diameter at which 10% of the pores are smaller in terms of a volume-based cumulative fraction in pore diameter distribution measurement. In at least one of the porous protective layers 90a to 90e, the value of the ratio D90/D10 is preferably 1.5 or less, more preferably 1.0 or less, and yet more preferably 0.5 or less. In at least one of the porous protective layers 90a to 90e, the value of the ratio D90/D10 may be 0.1 or more. At least one of the outer protective layers 91a to 91e may have D90 of 100 μm or less or 60 μm or less, and may have D90 of 1 μm or more or 2 μm or more. At least one of the inner protective layer 92a to 92e may have D10 of 1 μm or more or 5 μm or more, and may have D10 of 50 μm or less or 40 μm or less. In at least one of the outer protective layers 91a to 91e, the value of the ratio D90/R1, which is a ratio of D90 to the average pore diameter R1, is preferably 4 or less, more preferably 2 or less, and yet more preferably 1.5 or less. The value of the ratio D90/R1 may be 1 or more or 1.2 or more. In at least one of the inner protective layers 92a to 92e, the value of the ratio D10/R2, which is the ratio of D10 to the average pore diameter R2, is preferably 0.1 or more, more preferably 0.2 or more, and yet more preferably 0.5 or more. The value of the ratio D10/R2 may be 1 or less or 0.8 or less. The upper limit and the lower limit of the ratio D90/D10 described above can be used in any combination. Similarly, the upper limit and the lower limit of D90 described above can be used in any combination. The upper limit and the lower limit of D10 described above can be used in any combination. The upper limit and the lower limit of the ratio D90/R1 described above can be used in any combination. The upper limit and the lower limit of the ratio D10/R2 can be used in any combination.

In at least one of the porous protective layers 90a to 90e, the value of the ratio T1/T2 of the thickness T1 [µm] of the outer protective layer 91 to the thickness T2 [µm] of the inner protective layer 92 is preferably 1.0 or less. At this value, the thickness T2 of the inner protective layer 92 is relatively large, the distance between the element main body 101a and the outer protective layer 91 is thus relatively large, and cooling of the outer side of the element main body 101a is suppressed, thereby improving the waterproofing performance. The value of the ratio T1/T2 is the value derived based on the outer protective layer and the inner protective layer included in each of the porous protective layers 90a to 90e as with the ratio R1/R2. For example, the ratio T1/T2 of the porous protective layer 90a is derived based on the thickness T1 of the outer protective layer 91a and the thickness T2 of the inner protective layer 92a. In at least one of the porous protective layers 90a to 90e, the value of the ratio T1/T2 is more preferably 0.6 or less and yet more preferably 0.2 or less. In at least one of the porous protective layers 90a to 90e, the value of the ratio T1/T2 may be 0.1 or more. At least one of the outer protective layers 91a to 91e may have a thickness T1 of 30 or more or 50 µm or more, and may have a thickness T1 of 300 µm or less, 200 µm or less, 150 µm or less, or 100 µm or less. At least one of the inner protective layers 92a to 92e may have a thickness T2 of 170 µm or more, 200 µm or more, or 250 µm or more, and may have a thickness T2 of 400 µm or less. At least one of the porous protective layers 90a to 90e may have a thickness (in this embodiment, T1+T2) of 270 µm or more and 700 µm or less. The upper limit and the lower limit of the ratio T1/T2 described above can be used in any combination. Similarly, the upper limit and the lower limit of the thickness T1 described above can be used in any combination. The upper limit and the lower limit of the thickness T2 described above can be used in any combination.

At least one of the outer protective layers 91a to 91e preferably has a porosity P1 of 10% or more. At a porosity P1 of 10% or more, the pore volume inside the outer protective layer 91 is rarely insufficient with respect to the amount of moisture, and the outer protective layer 91 can easily sufficiently retain the moisture. At least one of the outer protective layers 91a to 91e preferably has a porosity P1 of 60% or less. At a porosity P1 of 60% or less, the moisture does not easily pass through the outer protective layer 91, and the outer protective layer 91 easily sufficiently retains the moisture. At least one of the inner protective layers 92a to 92e preferably has a porosity P2 of 20% or more. At a porosity P2 of 20% or more, deficiency of the heat-insulating effect brought by the inner protective layer 92 between the outer protective layer 91 and the element main body 101a can be suppressed. At least one of the inner protective layers 92a to 92e preferably has a porosity P2 of 70% or less. At a porosity P2 of 70% or less, deficiency of strength of the inner protective layer 92 can be suppressed.

In at least one of the porous protective layers 90a to 90e, the value of the ratio P1/P2 of the porosity P1 [%] of the outer protective layer 91 to the porosity P2 [%] of the inner protective layer 92 is preferably less than 2, more preferably less than 1, and yet more preferably 0.5 or less. In at least one of the porous protective layers 90a to 90e, the value of the ratio P1/P2 may be 0.2 or more. The smaller the value of the ratio P1/P2, the easier for the outer protective layer 91 to sufficiently retain moisture and the stronger the suppression of deficiency of the heat-insulating effect of the inner protective layer 92. Thus, the waterproofing performance of the element main body 101a is improved. The value of the ratio P1/P2 is the value derived based on the outer protective layer and the inner protective layer included in each of the porous protective layers 90a to 90e, as with the ratio R1/R2. For example, the ratio P1/P2 of the porous protective layer 90a is derived based on the porosity P1 of the outer protective layer 91a and the porosity P2 of the inner protective layer 92a. The upper limit and the lower limit of the ratio P1/P2 described above can be used in any combination.

The porosity P1 of the outer protective layer 91a is a value derived as described below using an image (SEM image) obtained by observation with a scanning electron microscope (SEM). First, the sensor element 101 is cut in a direction of the thickness of the outer protective layer 91a so as to obtain a section of the outer protective layer 91a that can be used as an observation surface. Then the section is embedded in resin and polished to prepare an observation sample. The magnifying power of the SEM is set to ×1,000 and the observation surface of the observation sample is photographed to obtain a SEM image of the outer protective layer 91a. Next, the obtained image is image-processed to determine the threshold by a discriminant analysis method (Otsu's method) from the luminance distribution of the luminance data of pixels in the image. Then the pixels in the image are binarized based on the determined threshold into body portions and pore portions so as to calculate the area of the body portions and the area of the pore portions. Then the ratio of the area of the pore portions relative to the total area (a total area of the body portions and the pore portions) is derived as the porosity P1. The porosity P1 of each of the outer protective layers 91b to 91e and the porosity P2 of each of the inner protective layers 92a to 92e are also derived through the same procedure.

The average pore diameter R1 and D90 of the outer protective layer 91a are determined by processing the above-mentioned binarized image of the SEM image with image processing software to measure the diameter of each pore and to derive the pore diameter distribution (histogram) based on the measured diameters, and then deriving the values on the basis of the derived pore diameter distribution. The average pore diameter R1 and D90 of each of the outer protective layers 91b to 91e and the average pore diameter R2 and D10 of each of the inner protective layers 92a to 92e are also the values derived through the same procedure. The SEM image can be acquired by using SU1510 produced by Hitachi High-Technologies Corporation. The image processing using the SEM image described above (derivation of the pore diameter distribution, R1, D90, R2, and D10) can be performed by using Image-Pro Plus 7.0 produced by Media Cybernetics, Inc.

In this embodiment, the thickness T1 of the outer protective layer 91a and the thickness T2 of the inner protective layer 92a are values determined as follows: First, a SEM image is acquired as in the description above in which a section of the porous protective layer 90a is used as an observation surface, and the boundary between the outer protective layer 91a and the inner protective layer 92a is identified by using the SEM image. A direction perpendicular to the surface (in this case, the upper surface of the second solid electrolyte layer 6) of the element main body 101a on which the porous protective layer 90a is formed is specified as the thickness direction. Then the distance from the surface (the upper surface in this case) of the porous protective layer 90a to the boundary in the thickness direction is derived as the thickness T1. The distance from the surface of the element main body 101a to the boundary in the thickness direction is derived as the thickness T2. The thickness T1 and the thickness T2 of each of the porous protective layers 90b to 90e are also values derived through the same procedure.

In this embodiment, the values of the average pore diameter R1, D90, the thickness T1, and the porosity P1 are set to be the same among the outer protective layers 91a to 91e. Similarly, the values of the average pore diameter R2, D10, the thickness T2, and the porosity P2 are set to be the same among the inner protective layers 92a to 92e.

Next, a method for manufacturing this gas sensor 100 is described. In the method for manufacturing the gas sensor 100, the element main body 101a is first manufactured and then the porous protective layer 90 is formed on the element main body 101a to manufacture the sensor element 101.

The method for manufacturing the element main body 101a is first described. First, six unfired ceramic green sheets are prepared. Then patterns for electrodes, insulating layers, resistance heating elements, and the like are printed on the ceramic green sheets respectively corresponding to the first substrate layer 1, the second substrate layer 2, the third substrate layer 3, the first solid electrolyte layer 4, the spacer layer 5, and the second solid electrolyte layer 6. Upon completion of formation of the various patterns, the green sheets are dried. Subsequently, the dried sheets are stacked to form a stack. The stack obtained as such includes plural element main bodies 101a. The stack is diced into pieces with a size of the element main body 101a, and the pieces are fired at a particular temperature to obtain the element main bodies 101a.

Next, the method for forming the porous protective layer 90 on the element main body 101a is described. In this embodiment, the porous protective layer 90 is formed by a dipping method using a slurry for an outer protective layer and a slurry for an inner protective layer that form an outer protective layer 91 and an inner protective layer 92 after firing. The slurry for an outer protective layer is, for example, a slurry prepared by dispersing a raw material powder (for example, ceramic particles described above, alumina in this embodiment) of the outer protective layer 91 and a pore-forming material in a solvent. A material that disappears during firing can be used as the pore-forming material, and examples thereof include theobromine and an acrylic resin. The solvent may be an organic solvent (for example, acetone) or an inorganic solvent (for example, water). The slurry for an inner protective layer is the same except that a raw material powder for the inner protective layer 92 is used as the raw material powder. A sintering aid (binder) may be added to at least one of the slurry for an outer protective layer and the slurry for an inner protective layer. The ratio of the raw material powder blended and the ratio of the pore-forming material blended in the slurry for an outer protective layer, the average particle diameter of the pore-forming material, and the 90% particle diameter (D90) of the pore-forming material are appropriately adjusted according to the intended average pore diameter R1, D90, and porosity P1 of the outer protective layer 91, for example. The 90% particle diameter of the pore-forming material is a value at which 90% of the particles are smaller in terms of a volume-based cumulative fraction in particle diameter distribution measurement by a laser diffraction/scattering method. Similarly, the ratio of the raw material powder blended and the ratio of the pore-forming material blended in the slurry for an inner protective layer, the average particle diameter of the pore-forming material, and the 10% particle diameter (D10) of the pore-forming material are appropriately adjusted according to the desired average pore diameter R2, D10, and porosity P2 of the inner protective layer 92, for example. The 10% particle diameter of the pore-forming material is a value at which 10% of the particles are smaller in terms of a volume-based cumulative fraction in particle diameter distribution measurement by a laser diffraction/scattering method. The viscosity of the slurry for an outer protective layer and the viscosity of the slurry for an inner protective layer are appropriately adjusted according to the thickness T1 of the outer protective layer 91 and the thickness T2 of the inner protective layer 92, respectively. At least one of the thickness T1 and the thickness T2 may be adjusted by increasing the number of times dipping (dipping and subsequent drying) described below is performed.

After the slurry for an outer protective layer and the slurry for an inner protective layer are prepared, first, the slurry for an inner protective layer is used to form a coating film by covering at least part of the surface of the solid electrolyte layers (layers 1 to 6) of the element main body 101a. Dipping is, for example, performed as follows. First, the element main body 101a is arranged to have its front end surface face downward, and the element main body 101a is dipped perpendicular to the surface of the slurry for an inner protective layer. During this process, the region that extends a distance L from the front end of the element main body 101a is dipped in the slurry for an inner protective layer. Then the element main body 101a is moved toward the rear and is slowly pulled out of the slurry for an inner protective layer. As a result, the region that extends a distance L toward the rear from the front end of the element main body 101a is covered with a coating film formed of the slurry for an inner protective layer. Note that, prior to dipping, a region of the element main body 101a not to be covered with the coating film may be covered with taping or the like to prevent adhesion of the slurry. The dipping method (the direction in which the element main body 101a is moved, for example) is not limited to one described above, and a known method described in the above-mentioned PTL 1 or the like can be employed. After pulling out the element main body 101a, the coating film is dried. During drying, the upper surface or the lower surface (the surface whose area covered with the coating film is the largest among the surfaces of the element main body 101a) of the element main body 101a is preferably arranged to face in a downward vertical direction. After drying, formation of a coating film by dipping using the slurry for an outer protective layer and drying are performed in the same manner.

After the coating films of the slurry for an outer protective layer and the slurry for an inner protective layer are formed and dried as described above, the coating films are fired at a particular firing temperature. As a result, the coating films become sintered and form a porous protective layer 90 that includes an outer protective layer 91 and an inner protective layer 92, and a sensor element 101 is obtained.

Subsequently, a gas sensor 100 including the sensor element 101 is manufactured. For example, an element sealing body is attached to the sensor element 101 to seal and fix the sensor element 101, and a connector and a lead wire are attached to a rear end side of the sensor element 101. A protective cover is attached to a part of the element sealing body on the front end side of the sensor element 101. An outer cylinder is attached to a part of the element sealing body on the rear end side of the sensor element 101, and the lead wire is pulled out from the outer cylinder to the exterior. The process of assembling the gas sensor 100 into which the sensor element 101 is built is known and, for example, disclosed in Japanese Unexamined Patent Application Publication No. 2015-178988.

When the gas sensor 100 configured as such is in operation, the gas to be measured flows into the protective cover of the gas sensor 100, reaches the sensor element 101, passes through the porous protective layer 90, and flows into the gas inlet 10. The sensor element 101 detects the NOx concentration in the gas to be measured that has flowed into the gas inlet 10. At this time, the moisture contained in the gas to be measured also enters the protective cover and sometimes adheres to the surface of the porous protective layer 90. The element main body 101a is adjusted to have a temperature (for example 800° C.), at which the solid electrolyte is activated, by using the heater 72, as described above. Thus, in general, when the moisture adheres to the sensor element 101, the temperature on the outer side of the element main body 101a drops rapidly, the temperature gradient between the inner side of the element main body 101a and the outer side of the element main body 101a becomes steep, and the element main body 101a may crack. Here, the porous protective layer 90 according to this embodiment is configured so that the value of the ratio R1/R2 of the average pore diameter of the outer protective layer 91 to the average pore diameter of the inner protective layer 92 is less than 1.0. In other words, the outer protective layer 91 has a smaller average pore diameter than the inner protective layer 92, and therefore the capillary force of the pores of the outer protective layer 91 is larger than that of the pores of the inner protective layer 92. As a result, for example, as illustrated in an enlarged portion of the outer protective layer 91a and the inner protective layer 92a in FIG. 3, the moisture adhered to the surface of the porous protective layer 90 spreads into the outer protective layer 91 and is easily retained in the outer protective layer 91. In contrast, the moisture from the outer protective layer 91 does not easily reach the inner protective layer 92. Thus, water rarely reaches the element main body 101a, cooling of the outer side of the element main body 101a is suppressed, and the temperature gradient between the inner side of the element main body 101a and the outer side of the element main body 101a at the time water droplets are adhered becomes more gentle. Thus, with the sensor element 101 according to this embodiment, the waterproofing performance of the element main body 101a is improved.

With the sensor element 101 according to this embodiment described in detail above in which the value of the ratio R1/R2 of the average pore diameter of the outer protective layer 91 to the average pore diameter of the inner protective layer 92 is less than 1.0, the waterproofing performance of the element main body 101a is improved. When the value of the ratio R1/R2 is 0.8 or less, the outer protective layer 91 more easily retains the moisture and thus the waterproofing performance of the element main body 101a is further improved. When the value of the ratio R1/R2 is 0.4 or less, the waterproofing performance of the element main body 101a is still further improved.

Furthermore, the value of the ratio D90/D10 of the outer protective layer 91 to the inner protective layer 92 is 2.0 or less. Thus, the pores of the outer protective layer 91 have a relatively small D90, and the outer protective layer 91 not only has a small average pore diameter but also a pore diameter distribution that tends to have fewer large-diameter pores. The pores of the inner protective layer 92 have a relatively large D10, and the inner protective layer 92 not only has a large average pore diameter but also a pore diameter distribution that tends to have fewer small-diameter pores. Therefore, the outer protective layer 91 more easily retains the moisture, it becomes more difficult for the moisture to reach the inner protective layer 92, and the waterproofing performance of the element main body 101a is further improved. When the value of the ratio D90/D10 is 1.5 or less, the waterproofing performance of the element main body 101a is further improved.

When the value of the ratio T1/T2 of the outer protective layer 91 to the inner protective layer 92 is 1.0 or less, the thickness T2 of the inner protective layer 92 is relatively large and the distance between the element main body 101a and the outer protective layer 91 can be set to a relatively large value. As a result, for example, water inside the outer protective layer 91 does not easily reach the element main body 101a, and the outer protective layer 91 and the element main body 101a are heat-insulated by the inner protective layer 92. Thus, cooling of the outer side of the element main body 101a is suppressed, and the waterproofing performance of the element main body 101a of the sensor element 101 is further improved. When the value of the ratio T1/T2 is 0.6 or less, the waterproofing performance of the element main body 101a is further improved.

When the porosity P1 of the outer protective layer 91 is 10% or more, deficiency of the pore volume inside the outer protective layer 91 with respect to the amount of moisture does not easily occur, and the outer protective layer 91 easily sufficiently retains the moisture. At a porosity P1 of 60% or less, the moisture does not easily pass through the outer protective layer 91, and the outer protective layer 91 easily sufficiently retains the moisture. When the porosity P2 of the inner protective layer 92 is 20% or more, deficiency of the heat-insulating effect between the outer protective layer 91 and the element main body 101a can be suppressed. At a porosity P2 of 70% or less, deficiency of the strength of the inner protective layer 92 can be suppressed. The smaller the value of the ratio P1/P2, the easier for the outer protective layer 91 to sufficiently retain the moisture and the easier the suppression of deficiency of the heat-insulating effect of the inner protective layer 92. Thus, the waterproofing performance of the element main body 101a is further improved.

The present invention is not limited by the embodiments described above and can naturally be implemented through various embodiments without departing from the technical scope of the present invention.

For example, in the embodiment described above, the value of the ratio R1/R2 is less than 1.0 in all of the porous protective layers 90a to 90e. Alternatively, it is sufficient if at least one of the outer protective layers 90a to 90e has a value of the ratio R1/R2 less than 1.0. As long as at least one of the porous protective layers 90a to 90e has a value of the ratio R1/R2 less than 1.0, the above-described effects are obtained from at least that porous protective layer. However, the number of the porous protective layers in which the value of the ratio R1/R2 is less than 1.0 among the porous protective layers 90a to 90e is preferably large. More preferably, all of the porous protective layers 90a to 90e (in other words, the entire porous protective layer 90) have a value of the ratio R1/R2 less than 1.0.

In the embodiment described above, for example, no mention is made regarding at which positions in the porous protective layer 90a may various parameters such as the ratio R1/R2 be derived. This is described now. Compared to the case in which there are no positions at which the value of the ratio R1/R2 is less than 1.0, the above-described effects can be obtained as long as the value of the ratio R1/R2 is less than 1.0 at any one position in the porous protective layer 90a measured in a section taken along the thickness direction of the porous protective layer 90*a*. However, the value of the ratio R1/R2 is preferably less than 1.0 at plural positions (for example, three positions) that are sufficiently apart from one another in a surface direction perpendicular to the thickness direction of the porous protective layer 90*a*. This also applies to the porous protective layers 90*b* to 90*e*. The same holds true for the above-described parameters (for example, the ratio D90/D10) other than the ratio R1/R2.

In the embodiment described above, the porous protective layer 90 includes the porous protective layers 90*a* to 90*e*, but the present invention is not limited to this. The porous protective layer 90 may have any structure as long as at least part of the element main body 101*a* is covered. For example, the porous protective layer 90 may lack one or more than one of the porous protective layers 90*a* to 90*e*.

In the embodiment described above, the porous protective layers 90*a* to 90*e* each have a two-layer structure, but the present invention is not limited to this. For example, the porous protective layer 90 may further include another layer on the outer side of the outer protective layer 91, another layer between the outer protective layer 91 and the inner protective layer 92, or another layer on the element main body 101*a*-side of the inner protective layer 92. When the porous protective layer 90 has a structure that includes three or more layers, two layers, between which the difference in average pore diameter is largest and in which the average pore diameter of the layer close to the outer surface of the porous protective layer 90 is smaller than that of the other layer, are identified. The layer close to the outer surface is assumed to be the outer protective layer 91, and the layer close to the element main body 101*a* is assumed to be the inner protective layer 92. Even when the porous protective layer 90 includes three or more layers, as long as the value of the ratio R1/R2 of the outer protective layer 91 to the inner protective layer 92 is less than 1.0, the above-described effects are obtained. When the porous protective layer 90 has a structure that includes three or more layers, the boundaries of the layers may be identified from a SEM image described above to derive the thickness T1, the thickness T2, etc.

In the embodiment described above, the porous protective layer 90 has a two-layer structure that includes the outer protective layer 91 and the inner protective layer 92, and the average pore diameter has a tendency to increase from the outer protective layer 91 toward the inner protective layer 92 in a step function manner. However, the present invention is not limited to this. For example, the porous protective layer 90 may include a total of three or more layers (three or more layers including the outer protective layer 91 and the inner protective layer 92) that are arranged to exhibit a tendency in which the average pore diameter increases from the outer protective layer 91 toward the inner protective layer 92. For example, the porous protective layer 90 may include one intermediate protective layer having an average pore diameter more than R1 and less than R2 and being disposed between the outer protective layer 91 and the inner protective layer 92. Alternatively, the porous protective layer 90 may include two or more intermediate protective layers having an average pore diameter more than R1 and less than R2, being disposed between the outer protective layer 91 and the inner protective layer 92, and being arranged to exhibit a tendency in which the average pore diameter increases from the outer protective layer 91 side toward the inner protective layer 92 side. When the porous protective layer 90 includes a total of three or more layers arranged to exhibit a tendency in which the average pore diameter increases from the outer protective layer 91 toward the inner protective layer 92, the porous protective layer 90 may have a tendency in which the average pore diameter increases in a step function manner from the outer protective layer 91 toward the inner protective layer 92, or have a tendency in which the average pore diameter increases continuously. Examples of the continuous change in average pore diameter include changes that take a linear pattern, a curved pattern, a line-chart pattern, and any combination of the foregoing. Even when the change takes various patterns, the above-described effects are obtained as long as the value of the ratio R1/R2 of the outer protective layer 91 to the inner protective layer 92 is less than 1.0. When another layer is disposed between the outer protective layer 91 and the inner protective layer 92, the boundaries of the layers may be identified from a SEM image described above and the thickness T1, the thickness T2, and the like may be derived. When the porous protective layer 90 has a tendency in which the average pore diameter increases from the outer protective layer 91 toward the inner protective layer 92 and when the boundary between the layers cannot be identified, the outer protective layer 91 and the inner protective layer 92 are identified through the following procedure. First, the distribution of the average pore diameter in the thickness direction is derived from a SEM image of a section taken in the thickness direction of the porous protective layer 90. Then, based on this distribution of the average pore diameter, two points between which the difference in the average pore diameter is the largest and in which one point close to the outer surface of the porous protective layer 90 has an average pore diameter smaller than that of the other point are identified. Of the two points, the point close to the outer surface of the porous protective layer 90 is assumed to be the point A and the average pore diameter at the point A is assumed to be the average pore diameter R1 of the outer protective layer 91. The average pore diameter at the other point, point B, is assumed to be the average pore diameter R2 of the inner protective layer 92. In the average pore diameter distribution, a region with an average pore diameter of (average pore diameter R1×1.1) or less is identified from the region around the point A in the thickness direction, and this region is assumed to be the outer protective layer 91. Similarly, in the average pore diameter distribution, a region with an average pore diameter of (average pore diameter R2×0.9) or more is identified from the region around the point B in the thickness direction, and this region is assumed to be the inner protective layer 92. Then D90, the thickness T1, and the porosity P1 are derived based on the identified outer protective layer 91, and D10, the thickness T2, and the porosity P2 are derived from the identified inner protective layer 92. This procedure is used not only when the porous protective layer 90 has a tendency in which the average pore diameter increases from the outer protective layer 91 toward the inner protective layer 92 but also when the boundary between the outer protective layer 91 and another layer or the boundary between the inner protective layer 92 and another layer cannot be identified.

Figure 4:
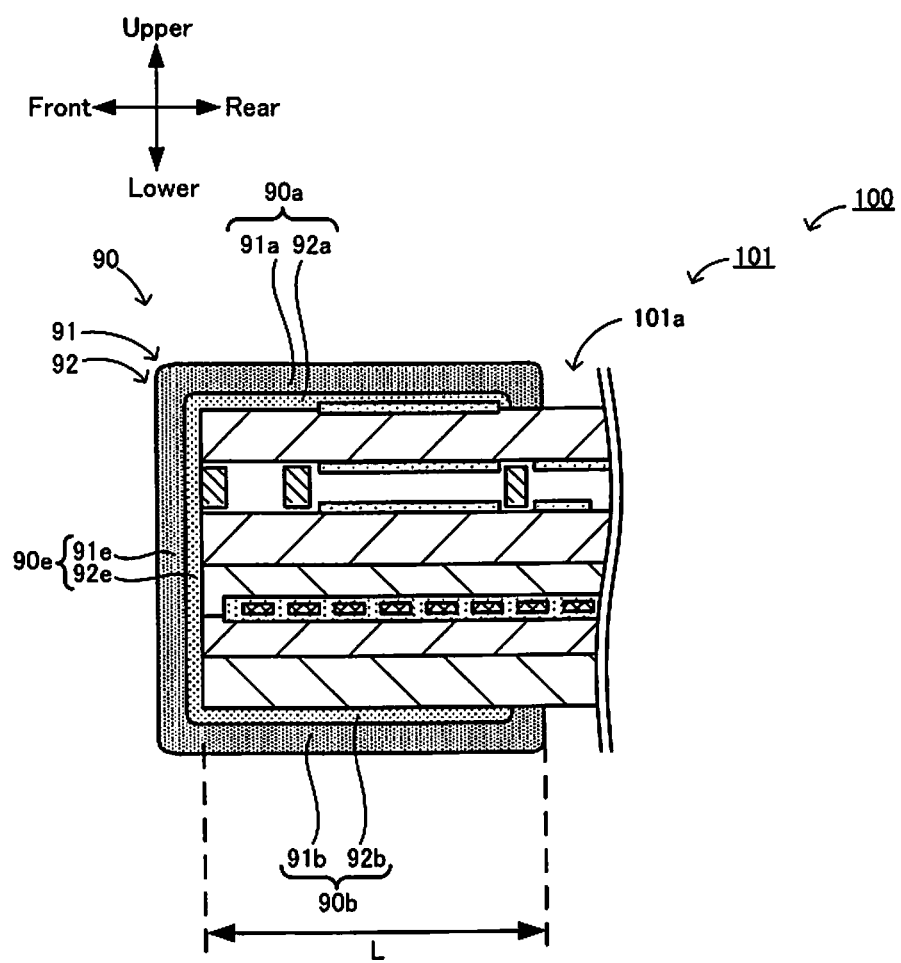
FIG. 4 is a schematic cross-sectional view showing an example of a structure of a gas sensor 100 according to a modification example.
Figure 5:
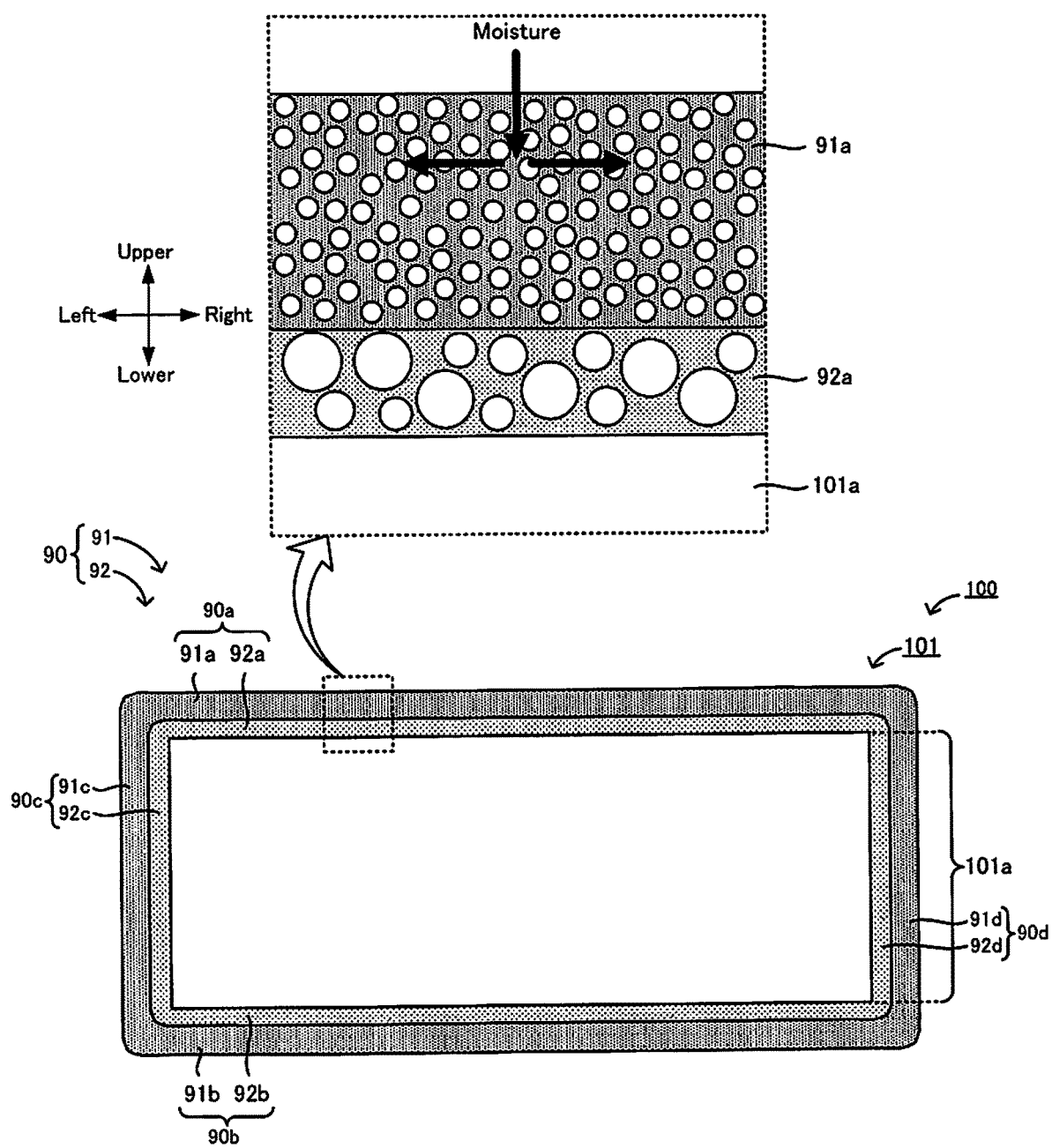
FIG. 5 is a sectional view perpendicular to a front/rear direction of the gas sensor 100 according to the modification example.

In the embodiment described above, for example, as illustrated in FIGS. 4 and 5, in at least one of the porous protective layers 90*a* to 90*e*, the value of the ratio T1/T2 may be larger than 1.0. In at least one of the porous protective layers 90*a* to 90*e*, the value of the ratio T1/T2 may be 30.0 or less. In all of the porous protective layers 90*a* to 90*e* (in other words, the entire porous protective layer 90), the value of the ratio R1/R2 may be larger than 1.0. In all of the porous protective layers 90a to 90e (in other words, the entire porous protective layer 90), the value of the ratio R1/R2 may be 30.0 or less.

In the embodiment described above, the porosity P1 may be 5% or more. The porosity P1 may be less than 10%. The porosity P2 may be 10% or more. The porosity P2 may be less than 20%.

In the embodiment described above, the outer protective layer 91 and the inner protective layer 92 are both formed of the same ceramic material (alumina), but the present invention is not limited to this. The materials of the two layers may be different.

In the embodiment described above, the porous protective layer 90 is formed by a dipping method, but the present invention is not limited to this. For example, the porous protective layer 90 may be formed by screen printing, a gel-casting method, or plasma spraying.

EXAMPLES

Examples of actually manufacturing sensor elements are described below. Experimental Examples 1 to 24, 27, and 28 to 42 correspond to Examples of the present invention and Experimental Examples 25 and 26 correspond to Comparative Examples. The present invention is not limited to the examples described below.

Experimental Example 1

In Experimental Example 1, a sensor element was manufactured by the method for manufacturing the sensor element 101 according to the embodiment described above. First, an element main body 101a having a length of 67.5 mm in the front/rear direction, a width of 4.25 mm in the left/right direction, and a thickness of 1.45 mm in the vertical direction illustrated in FIG. 2 was made. In making the element main body 101a, ceramic green sheets were prepared by mixing zirconia particles containing 4 mol % of yttria acting as a stabilizer, an organic binder, and an organic solvent, and forming the resulting mixture by tape casting.

Next, a slurry for an inner protective layer was prepared. An alumina powder having an average particle diameter of 0.3 μm was prepared as the raw material powder. The raw material powder was dried at 100° C. for 2 hours. Silicon dioxide acting as a sintering aid was dissolved in acetone and n-butyl acetate used as solvents to prepare a binder solution. The dried raw material powder, an acrylic pore-forming material, and the binder solution were mixed in a pot mill mixer at a rotation speed of 200 rpm to 250 rpm to prepare a slurry for an inner protective layer. A pore-forming material having an average particle diameter and a 10% particle diameter (D10) shown in Table 1 was used as the pore-forming material. The ratio (volume %) of blending the raw material powder and the pore-forming material was the value shown in Table 1. The viscosity of the slurry was 10 to 15 [Pa·s]. The average particle diameter and the 10% particle diameter (D10) of the pore-forming material were measured with a Laser Scattering Particle Size Distribution Analyzer (LA-920) produced by HORIBA, Ltd.

Next, as in the embodiment described above, a coating film was formed on a surface of the element main body 101a by dipping using the slurry for an inner protective layer. The distance L was set to 10 mm. The pulling rate of pulling the sensor element 101 out of the slurry was set to 5 mm/s. Drying was performed in a continuous drying furnace at 80° C. to 90° C. for 15 minutes×2 to dry the coating film of the sensor element 101. During drying, the lower surface of the sensor element 101 illustrated in FIG. 3 was arranged to face in a downward vertical direction. This process was repeated until the desired thickness was obtained.

A slurry for an outer protective layer was prepared, and a coating film was formed by dipping in the same manner. The slurry for an outer protective layer was prepared by the same process as the slurry for an inner protective layer except for the blend ratio of the raw material particles and the pore-forming material and except that the average particle diameter and the 90% particle diameter (D90) of the pore-forming material were the values shown in Table 1.

Lastly, the coating films were fired. Specifically, the temperature was elevated at a temperature elevation rate of 100° C./h until 1100° C. and held at 1100° C. for 3 hours, and then the coating films were naturally cooled to room temperature. The cooling rate was 131.4° C./h from 1100° C. to 1000° C. and 250° C./h from 1000° C. to room temperature. As a result, the coating films became sintered and a porous protective layer 90 having a two-layer structure illustrated in FIGS. 2 and 3 was formed and a sensor element 101 of Experimental Example 1 was obtained.

Experimental Examples 2 to 8

Sensor elements 101 of Experimental Examples 2 to 8 were prepared by adjusting the ratio P1/P2 and the ratio T1/T2 to particular values, respectively, and changing the ratio R1/R2 and the ratio D90/D10 as shown in Table 1.

Experimental Examples 9 to 14

Sensor elements 101 of Experimental Examples 9 to 14 were prepared by adjusting the ratio P1/P2, the ratio R1/R2, and the ratio T1/T2 to particular values, respectively, and changing the ratio D90/D10 as shown in Table 1.

Experimental Examples 15 to 17

Sensor elements 101 of Experimental Examples 15 to 17 were prepared by adjusting the ratio P1/P2, the ratio R1/R2, and the ratio D90/D10 to particular values, respectively, and changing the ratio T1/T2 as shown in Table 1.

Experimental Examples 18 to 21

Sensor elements 101 of Experimental Examples 18 to 21 were prepared by adjusting the ratio R1/R2, the ratio D90/D10, and the ratio T1/T2 to particular values, respectively, and changing the ratio P1/P2 as shown in Table 1.

Experimental Examples 22 to 24

A sensor element 101 of Experimental Example 22 was prepared by adjusting the ratio P1/P2, the ratio R1/R2, the ratio D90/D10, and the ratio T1/T2 to particular values, respectively, and changing the raw material particles for the slurry for an outer protective layer and the slurry for an inner protective layer to a zirconia powder. Similarly, a sensor element 101 of Experimental Example 23 was prepared by changing the raw material particles of the slurry for an outer protective layer and the slurry for an inner protective layer to a spinel powder, and a sensor element 101 of Experimental Example 24 was prepared by changing the raw material particles to a mullite powder. In Experimental Examples 22 to 24, the sensor element 101 was prepared under the same conditions as those in Experimental Example 3 except for the material of the raw material particles.

Experimental Examples 25 and 26

Sensor elements 101 modified to adjust the ratio R1/R2 to a value exceeding 1.0 were prepared as Experimental Examples 25 and 26.

Experimental Example 27

A sensor element 101 that included a porous protective layer 90 having a four-layer structure having a tendency in which the average pore diameter increased from the outer protective layer 91 toward the inner protective layer 92 was prepared as Experimental Example 27. In Experimental Example 27, first to fourth slurries shown in Table 2 using an alumina powder as the raw material particles were prepared, and dipping was performed in the order of the fourth, third, second, and first slurry so as to form a sensor element 101 having a four-layer-structure porous protective layer 90. The first slurry was a slurry for an outer protective layer and was the same slurry as the slurry for an outer protective layer used in Experimental Example 3. The fourth slurry was a slurry for an inner protective layer and was the same slurry as the slurry for an inner protective layer used in Experimental Example 3.

[Derivation of Parameters of Outer Protective Layer and Inner Protective Layer]

For each of Experimental Examples 1 to 27, the porosity P1, the average pore diameter R1, the 90% pore diameter (D90), and the thickness T1 of the outer protective layer 91 and the porosity P2, the average pore diameter R2, the 10% pore diameter (D10), and the thickness T2 of the inner protective layer 92 were derived by the methods described above. Acquisition of the SEM images and image-processing were conducted with SU1510 produced by Hitachi High-Technologies Corporation and Image-Pro Plus 7.0 produced by Media Cybernetics, Inc. In all of Experimental Examples 1 to 27, the respective values of the average pore diameter R1, D90, the thickness T1, and the porosity P1 were the same among the outer protective layers 91a to 91e. Similarly, the respective values of the average pore diameter R2, D10, the thickness T2, and the porosity P2 were the same among the inner protective layers 92a to 92e.

[Evaluation of Waterproofing Performance]

Performance of the porous protective layers 90 (waterproofing performance of the element main bodies 101a) of the sensor elements of Experimental Examples 1 to 27 was evaluated. Specifically, first, the heater 72 was powered to adjust the temperature to 800° C., and the element main body 101a was heated. Under this condition, the main pump cell 21, the auxiliary pump cell 50, the main pump controlling oxygen partial pressure detection sensor cell 80, and the auxiliary pump controlling oxygen partial pressure detection sensor cell 81, etc., were actuated in an air atmosphere and were controlled to maintain the oxygen concentration in the first internal space 20 at a particular value. After waiting to stabilize the pump current Ip0, water droplets were dropped onto the porous protective layer 90, and the presence or absence of cracks in the element main body 101a was determined based on whether or not the pump current Ip0 changed to a value exceeding a predetermined threshold. If the element main body 101a cracks due to thermal shock caused by water droplets, oxygen passes through the cracked portion and easily flows into the first internal space 20. Thus, the value of the pump current Ip0 increases. Therefore, cases in which the pump current Ip0 exceeded a predetermined threshold determined by experiments were determined to be the cases in which the element main body 101a cracked due to the water droplets. Testing was conducted more than once by gradually increasing the amount of water droplets, and the amount of water droplets at which cracking first occurred was assumed to be the waterproofing amount [μL]. The waterproofing amount [μL] was derived as an average of conducting the test three times for each of the sensor elements of Experimental Examples 1 to 27. The larger the waterproofing amount, the higher the waterproofing performance of the element main body 101a.

The information regarding the raw material particles and the pore-forming materials in the slurry for forming an outer protective layer and the slurry for an inner protective layer, various parameters regarding the outer protective layer 91 and the inner protective layer 92, and the waterproofing amount in each of Experimental Examples 1 to 26 are summarized in Table 1. Similarly, information regarding Experimental Example 27 is summarized in Table 2.

TABLE 1

| | Slurry for an outer protective layer | | | | Slurry for an inner protective later | | | | Outer protective layer | | | | |
|---|---|---|---|---|---|---|---|---|---|---|---|---|---|
| | | Pore-forming material | | | | Pore-forming material | | | | Pore diameter | | | |
| | Raw material | | Average particle | | Raw material | | Average particle | | Porosity | Average | | | Thickness |
| | Material | Volume [%] | Volume [%] | diameter [μm] | D90 [μm] | Volume [%] | Volume [%] | diameter [μm] | D10 [μm] | P1 [%] | R1 [μm] | D90 [μm] | D90/R1 | T1 [μm] |
| Experimental Example 1 | Alumina | 70 | 30 | 0.6 | 2.4 | 52 | 48 | 6 | 3.6 | 25 | 0.5 | 2 | 4 | 50 |
| Experimental Example 2 | Alumina | 70 | 30 | 0.6 | 2.4 | 40 | 60 | 30 | 18 | 25 | 0.5 | 2 | 4 | 50 |
| Experimental Example 3 | Alumina | 70 | 30 | 12 | 18 | 40 | 60 | 30 | 18 | 25 | 10 | 15 | 15 | 50 |
| Experimental Example 4 | Alumina | 70 | 30 | 24 | 29 | 40 | 60 | 30 | 24 | 25 | 20 | 24 | 12 | 50 |
| Experimental Example 5 | Alumina | 70 | 30 | 6 | 12 | 40 | 60 | 60 | 30 | 25 | 5 | 10 | 2 | 50 |
| Experimental Example 6 | Alumina | 70 | 30 | 12 | 18 | 40 | 60 | 60 | 30 | 25 | 10 | 15 | 1.5 | 50 |
| Experimental Example 7 | Alumina | 70 | 30 | 24 | 30 | 40 | 60 | 60 | 30 | 25 | 20 | 25 | 1.25 | 50 |

TABLE 1-continued

| Example | Material | | | | | | | | | | | | | |
|---|---|---|---|---|---|---|---|---|---|---|---|---|---|---|
| Experimental Example 8 | Alumina | 70 | 30 | 12 | 18 | 40 | 60 | 120 | 84 | 25 | 10 | 15 | 1.5 | 50 |
| Experimental Example 9 | Alumina | 70 | 30 | 12 | 20 | 40 | 60 | 60 | 48 | 25 | 10 | 15 | 1.5 | 50 |
| Experimental Example 10 | Alumina | 70 | 30 | 12 | 18 | 40 | 60 | 60 | 12 | 25 | 10 | 15 | 1.5 | 50 |
| Experimental Example 11 | Alumina | 70 | 30 | 12 | 18 | 40 | 60 | 60 | 7.2 | 25 | 10 | 15 | 1.5 | 50 |
| Experimental Example 12 | Alumina | 70 | 30 | 12 | 14 | 40 | 60 | 60 | 30 | 25 | 10 | 12 | 1.2 | 50 |
| Experimental Example 13 | Alumina | 70 | 30 | 12 | 43 | 40 | 60 | 60 | 30 | 25 | 10 | 36 | 3.6 | 50 |
| Experimental Example 14 | Alumina | 70 | 30 | 12 | 72 | 40 | 60 | 60 | 30 | 25 | 10 | 60 | 6 | 50 |
| Experimental Example 15 | Alumina | 70 | 30 | 12 | 18 | 40 | 60 | 30 | 18 | 25 | 10 | 15 | 1.5 | 20 |
| Experimental Example 16 | Alumina | 70 | 30 | 12 | 18 | 40 | 60 | 30 | 18 | 25 | 10 | 15 | 1.5 | 150 |
| Experimental Example 17 | Alumina | 70 | 30 | 12 | 18 | 40 | 60 | 30 | 18 | 25 | 10 | 15 | 1.5 | 200 |
| Experimental Example 18 | Alumina | 88 | 12 | 12 | 18 | 40 | 80 | 30 | 18 | 10 | 10 | 15 | 1.5 | 50 |
| Experimental Example 19 | Alumina | 40 | 60 | 12 | 18 | 40 | 60 | 30 | 18 | 50 | 10 | 15 | 1.5 | 50 |
| Experimental Example 20 | Alumina | 40 | 60 | 12 | 18 | 70 | 30 | 30 | 18 | 50 | 10 | 15 | 1.5 | 50 |
| Experimental Example 21 | Alumina | 70 | 30 | 12 | 18 | 16 | 54 | 30 | 18 | 25 | 10 | 15 | 1.5 | 50 |
| Experimental Example 22 | Zirconia | 70 | 30 | 12 | 16 | 40 | 60 | 30 | 18 | 25 | 10 | 15 | 1.5 | 50 |
| Experimental Example 23 | Spinel | 70 | 30 | 12 | 18 | 40 | 60 | 30 | 18 | 25 | 10 | 15 | 1.5 | 50 |
| Experimental Example 24 | Mullite | 70 | 30 | 12 | 18 | 40 | 60 | 30 | 18 | 25 | 10 | 15 | 1.5 | 50 |
| Experimental Example 25 | Alumina | 64 | 36 | 48 | 72 | 40 | 60 | 30 | 18 | 30 | 40 | 60 | 1.5 | 50 |
| Experimental Example 26 | Alumina | 64 | 36 | 36 | 54 | 40 | 60 | 30 | 18 | 30 | 30 | 45 | 1.5 | 50 |

| | Inner protective layer | | | | | Ratio of an outer protective layer to an inner protective layer | | | | Waterproofing amount [μL] |
|---|---|---|---|---|---|---|---|---|---|---|
| | Porosity P2 [%] | Average R2 [μm] | Pore diameter D10 [μm] | D10/R2 | Thickness T2 [μm] | Porosity ratio P1/P2 | Ratio of average pore diameter R1/R2 | Ratio D90/D10 | Thickness ratio T1/T2 | |
| Experimental Example 1 | 40 | 5 | 3 | 0.6 | 350 | 0.63 | 0.10 | 0.67 | 0.14 | 42 |
| Experimental Example 2 | 50 | 25 | 15 | 0.6 | 350 | 0.50 | 0.02 | 0.13 | 0.14 | 53 |
| Experimental Example 3 | 50 | 25 | 15 | 0.6 | 350 | 0.50 | 0.40 | 1.00 | 0.14 | 25 |
| Experimental Example 4 | 50 | 25 | 20 | 0.8 | 350 | 0.50 | 0.80 | 1.20 | 0.14 | 20 |
| Experimental Example 5 | 50 | 50 | 25 | 0.8 | 350 | 0.50 | 0.10 | 0.40 | 0.14 | 41 |
| Experimental Example 6 | 50 | 50 | 25 | 0.8 | 350 | 0.50 | 0.20 | 0.60 | 0.14 | 34 |
| Experimental Example 7 | 50 | 50 | 25 | 0.5 | 350 | 0.50 | 0.40 | 1.00 | 0.14 | 27 |
| Experimental Example 8 | 50 | 100 | 70 | 0.2 | 350 | 0.50 | 0.10 | 0.21 | 0.14 | 51 |
| Experimental Example 9 | 50 | 50 | 40 | 0.8 | 350 | 0.50 | 0.20 | 0.38 | 0.14 | 45 |
| Experimental Example 10 | 50 | 50 | 10 | 0.2 | 350 | 0.50 | 0.20 | 1.50 | 0.14 | 19 |
| Experimental Example 11 | 50 | 50 | 6 | 0.12 | 350 | 0.50 | 0.20 | 2.50 | 0.14 | 12 |
| Experimental Example 12 | 50 | 50 | 25 | 0.5 | 350 | 0.50 | 0.20 | 0.48 | 0.14 | 38 |
| Experimental Example 13 | 50 | 50 | 25 | 0.5 | 350 | 0.50 | 0.20 | 1.44 | 0.14 | 21 |
| Experimental Example 14 | 50 | 50 | 25 | 0.5 | 350 | 0.50 | 0.20 | 2.40 | 0.14 | 14 |

TABLE 1-continued

| | Porosity P2 [%] | Average R2 [μm] | D10 [μm] | D10/R2 | Thickness T2 [μm] | Porosity ratio P1/P2 | Ratio R1/R2 | Ratio D90/D10 | Thickness ratio T1/T2 | Waterproofing amount [μL] |
|---|---|---|---|---|---|---|---|---|---|---|
| Experimental Example 15 | 50 | 25 | 15 | 0.6 | 380 | 0.50 | 0.40 | 1.00 | 0.06 | 31 |
| Experimental Example 16 | 50 | 25 | 15 | 0.6 | 250 | 0.50 | 0.40 | 1.00 | 0.60 | 21 |
| Experimental Example 17 | 50 | 25 | 15 | 0.6 | 200 | 0.50 | 0.40 | 1.00 | 1.00 | 18 |
| Experimental Example 18 | 50 | 25 | 15 | 0.6 | 350 | 0.20 | 0.40 | 1.00 | 0.14 | 29 |
| Experimental Example 19 | 50 | 25 | 15 | 0.6 | 350 | 1.00 | 0.40 | 1.00 | 0.14 | 24 |
| Experimental Example 20 | 25 | 25 | 15 | 0.6 | 350 | 2.00 | 0.40 | 1.00 | 0.14 | 17 |
| Experimental Example 21 | 70 | 25 | 15 | 0.6 | 350 | 0.38 | 0.40 | 1.00 | 0.14 | 26 |
| Experimental Example 22 | 50 | 25 | 15 | 0.6 | 350 | 0.50 | 0.40 | 1.00 | 0.14 | 26 |
| Experimental Example 23 | 50 | 25 | 15 | 0.6 | 350 | 0.50 | 0.40 | 1.00 | 0.14 | 24 |
| Experimental Example 24 | 50 | 25 | 15 | 0.6 | 350 | 0.50 | 0.40 | 1.00 | 0.14 | 28 |
| Experimental Example 25 | 50 | 25 | 15 | 0.6 | 350 | 0.6 | 1.6 | 4 | 0.14 | 4 |
| Experimental Example 26 | 50 | 25 | 15 | 0.6 | 350 | 0.6 | 1.2 | 3 | 0.14 | 7 |

TABLE 2

| | First slurry (for an outer protective layer) | | | | Second slurry | | | | Third slurry | | | |
|---|---|---|---|---|---|---|---|---|---|---|---|---|
| | Raw material | | Pore-forming material | | Raw material | | Pore-forming material | | Raw material | | Pore-forming material | |
| | Material | Volume [%] | Volume [%] | Average particle diameter [μm] | D90 [μm] | Volume [%] | Volume [%] | Average particle diameter [μm] | D90 [μm] | Volume [%] | Volume [%] | Average particle diameter [μm] | D10 [μm] |
| Experimental Example 27 | Alumina | 70 | 30 | 12 | 18 | 60 | 40 | 18 | 24 | 50 | 50 | 24 | 16 |

| | Fourth slurry (for an inner protective layer) | | | | Outer protective layer | | | | |
|---|---|---|---|---|---|---|---|---|---|
| | Raw material Volume [%] | Pore-forming material | | | Porosity P1 [%] | Pore diameter | | | Thickness T1 [μm] |
| | | Volume [%] | Average particle diameter [μm] | D10 [μm] | | Average R1 [μm] | D90 [μm] | D90/R1 | |
| Experimental Example 27 | 40 | 60 | 30 | 18 | 25 | 10 | 15 | 1.5 | 50 |

| | Inner protective layer | | | | | Ratio of an outer protective layer to an inner protective layer | | | | |
|---|---|---|---|---|---|---|---|---|---|---|
| | | Pore diameter | | | | | Ratio of average | | | |
| | Porosity P2 [%] | Average R2 [μm] | D10 [μm] | D10/R2 | Thickness T2 [μm] | Porosity ratio P1/P2 | pore diameter R1/R2 | Ratio D90/D10 | Thickness ratio T1/T2 | Waterproofing amount [μL] |
| Experimental Example 27 | 50 | 25 | 15 | 0.6 | 350 | 0.5 | 0.4 | 1.0 | 0.14 | 25 |

Table 1 shows that, in all of Experimental Examples 1 to 24 in which the value of the ratio R1/R2 of the average pore diameter was less than 1.0, the waterproofing amount exceeded 10 μL and was larger than in Experimental Examples 23 and 24 in which the value of the ratio R1/R2 exceeded 1. In other words, the waterproofing performance of the element main body 101a was improved in Experimental Examples 1 to 24 because the value of the ratio R1/R2 was less than 1.0. The results of Experimental Examples 1 to 8 showed that the waterproofing performance had a tendency to improve as the ratio R1/R2 decreased. The results of Experimental Examples 1 to 8 suggest that the value of the ratio R1/R2 is preferably 0.8 or less, more preferably 0.4 or less, and yet more preferably 0.1 or less. In Experimental Examples 3 and 7, the value of D90 of the outer protective layer 91 is different from each other and the value of D10 of the inner protective layer 92 is different from each other, but the value of the ratio D90/D10 is the same. In Experimental Examples 3 and 7, the waterproofing amount was about the same. This suggests that the magnitude of the value of the ratio D90/D10 has a larger influence on the waterproofing amount than the magnitude of the individual values of D90 and D10.

The results of Experimental Examples 9 to 14 showed a tendency for the waterproofing performance to improve with the decrease in the ratio D90/D10. The results of Experimental Examples 9 to 14 suggest that the value of the ratio D90/D10 is preferably 2.0 or less, more preferably 1.5 or less, yet more preferably, 1.0 or less, and most preferably 0.5 or less.

The results of Experimental Examples 15 to 17 showed a tendency for the waterproofing performance to improve with the decrease in the thickness ratio T1/T2. The results of Experimental Examples 15 to 17 suggest that the value of the ratio T1/T2 is preferably 1.0 or less, more preferably 0.6 or less, and yet more preferably 0.2 or less.

The results of Experimental Examples 18 to 21 showed a tendency for the waterproofing performance to improve with the decrease in the porosity ratio P1/P2. The results of Experimental Examples 18 to 21 suggest that the value of the ratio P1/P2 is preferably less than 2, more preferably less than 1, and yet more preferably 0.5 or less.

The waterproofing amount in Experimental Examples 22 to 24 was about the same as the waterproofing amount in Experimental Example 3 whose the only difference from the Experimental Examples 22 to 24 was the material of the raw material particles. This result suggests that even when the raw material particles of the outer protective layer 91 and the inner protective layer 92 are changed, the same effect is obtained as long as, for example, the value of the ratio R1/R2 is less than 1.0.

The waterproofing amount in Experimental Example 27 shown in Table 2 was the same as the waterproofing amount in Experimental Example 3 in which various parameters regarding the outer protective layer 91 and the inner protective layer 92 were the same. This result suggests that even when another layer is present between the outer protective layer 91 and the inner protective layer 92, the same effect is obtained as long as, for example, the value of the ratio R1/R2 is less than 1.0. The thickness of the entire porous protective layer 90 in Experimental Example 27 was 400 μm.

Experimental Examples 28 to 34

Sensor elements 101 of Experimental Examples 28 to 34 were prepared as in Experimental Example 1 except that the ratio T1/T2 was changed in a variety of ways as shown in Table 3 while adjusting the ratios P1/P2, R1/R2, and D90/D10 to particular values.

Experimental Examples 35 to 42

In Experimental Examples 35 to 42, the element main body 101a was prepared as in Experimental Example 1, and the sensor element 101 was prepared by forming a porous protective layer 90 by plasma spraying. The porous protective layer 90 in Experimental Examples 35 to 42 was formed as follows. SinplexPro-90 produced by Oerlikon Metco was used as the spray gun. In forming the inner protective layer 92, alumina having an average particle diameter of 20 μm was used as the spray raw material; the spray output, the spray distance, and the gun angle were set to the values shown in Table 4; the flow rate of the Ar gas used as a primary gas for plasma generation was set to 45 L/min; the flow rate of the $N_2$ gas used as a secondary gas for plasma generation was set to 5 L/min; and the flow rate of the Ar gas used as a carrier gas for the spray raw material was set to 5 L/min. Under this condition, the spray gun was scanned in front of the element main body 101a with a 400 mm stroke at a rate of 200 mm/sec to conduct spraying with the spray gun on the element main body 101a rotating at 100 rpm so as to form a porous sprayed film, which served as the inner protective layer 92, having a thickness T2 shown in Table 4. Next, the outer protective layer 91 was formed. In forming the outer protective layer 91, the same spray raw material as the inner protective layer 92 was used; and the spray output, the spray distance, and the gun angle were set to the values shown in Table 4. Other conditions were the same as those for the inner protective layer 92, and a porous sprayed film, which served as the outer protective layer 91, having a thickness T1 shown in Table 4 was formed.

[Derivation of Parameters of Outer Protective Layer and Inner Protective Layer]

In Experimental Examples 28 to 42, various parameters were derived as in Experimental Examples 1 to 27. The results are shown in Tables 3 and 4. In all of Experimental Examples 28 to 42, the values of the average pore diameter R1, D90, the thickness T1, and the porosity P1 were the same among the outer protective layers 91a to 91e. Similarly, in all of Experimental Examples 28 to 42, the values of the average pore diameter R2, D10, the thickness T2, and the porosity P2 were the same among the inner protective layers 92a to 92e.

[Evaluation of Waterproofing Performance]

The waterproofing amounts of the sensor elements of Experimental Examples 28 to 42 were derived by the same method as in Experimental Examples 1 to 27. The results are shown in Tables 3 and 4.

TABLE 3

| | Slurry for an outer protective layer | | | | Slurry for an inner protective later | | | | Outer protective layer | | | | |
|---|---|---|---|---|---|---|---|---|---|---|---|---|---|
| | Raw material | | Pore-forming material | | Raw material | | Pore-forming material | | | Pore diameter | | | Thickness |
| | | | Average | | | | Average | | | | | | |
| | Material | Volume [%] | Volume [%] | particle diameter [μm] | D90 [μm] | Volume [%] | Volume [%] | particle diameter [μm] | D10 [μm] | Porosity P1 [%] | Average R1 [μm] | D90 [μm] | D90/R1 | T1 [μm] |
| Experimental Example 28 | Alumina | 70 | 30 | 12 | 18 | 40 | 60 | 30 | 18 | 25 | 10 | 15 | 1.5 | 300 |
| Experimental Example 29 | Alumina | 70 | 30 | 12 | 18 | 40 | 60 | 30 | 18 | 25 | 10 | 15 | 1.5 | 350 |
| Experimental Example 30 | Alumina | 70 | 30 | 12 | 18 | 40 | 60 | 30 | 18 | 25 | 10 | 15 | 1.5 | 370 |
| Experimental Example 31 | Alumina | 70 | 30 | 12 | 18 | 40 | 60 | 30 | 18 | 25 | 10 | 15 | 1.5 | 385 |
| Experimental Example 32 | Alumina | 70 | 30 | 12 | 18 | 40 | 60 | 30 | 18 | 25 | 10 | 15 | 1.5 | 450 |
| Experimental Example 33 | Alumina | 70 | 30 | 12 | 18 | 40 | 60 | 30 | 18 | 25 | 10 | 15 | 1.5 | 300 |
| Experimental Example 34 | Alumina | 70 | 30 | 12 | 18 | 40 | 60 | 30 | 18 | 25 | 10 | 15 | 1.5 | 200 |

| | Inner protective layer | | | | | Ratio of an outer protective layer to an inner protective layer | | | | |
|---|---|---|---|---|---|---|---|---|---|---|
| | | Pore diameter | | | | | Ratio of average | | | |
| | Porosity P2 [%] | Average R2 [μm] | D10 [μm] | D10/R2 | Thickness T2 [μm] | Porosity ratio P1/P2 | pore diameter R1/R2 | Ratio D90/D10 | Thickness ratio T1/T2 | Waterproofing amount [μL] |
| Experimental Example 28 | 50 | 25 | 15 | 0.6 | 100 | 0.50 | 0.40 | 1.00 | 3.00 | 18 |
| Experimental Example 29 | 50 | 25 | 15 | 0.6 | 50 | 0.50 | 0.40 | 1.00 | 7.00 | 17 |
| Experimental Example 30 | 50 | 25 | 15 | 0.6 | 30 | 0.50 | 0.40 | 1.00 | 12.33 | 17 |
| Experimental Example 31 | 50 | 25 | 15 | 0.6 | 15 | 0.50 | 0.40 | 1.00 | 25.67 | 17 |
| Experimental Example 32 | 50 | 25 | 15 | 0.6 | 15 | 0.50 | 0.40 | 1.00 | 30.00 | 20 |
| Experimental Example 33 | 50 | 25 | 15 | 0.6 | 15 | 0.50 | 0.40 | 1.00 | 20.00 | 16 |
| Experimental Example 34 | 50 | 25 | 15 | 0.6 | 15 | 0.50 | 0.40 | 1.00 | 13.33 | 15 |

TABLE 4

| | Outer protective layer | | | Inner protective layer | | | Outer protective layer | | | | |
|---|---|---|---|---|---|---|---|---|---|---|---|
| | | | | | | | | Pore diameter | | | |
| | Spray raw material | Spray output [kW] | Spray distance [mm] | Gun angle [°] | Spray output [kW] | Spray distance [mm] | Gun angle [°] | Porosity P1 [%] | Average R1 [μm] | D90 [μm] | D90/R1 | Thickness T1 [μm] |
| Experimental Example 35 | Alumina | 25 | 110 | 0 | 25 | 110 | 45 | 7 | 8 | 18 | 2.3 | 50 |
| Experimental Example 36 | Alumina | 25 | 140 | 0 | 25 | 140 | 45 | 12 | 10 | 20 | 2.0 | 50 |
| Experimental Example 37 | Alumina | 25 | 170 | 0 | 25 | 170 | 45 | 20 | 12 | 22 | 1.8 | 50 |
| Experimental Example 38 | Alumina | 25 | 110 | 0 | 25 | 170 | 45 | 7 | 8 | 18 | 2.3 | 50 |
| Experimental Example 39 | Alumina | 25 | 110 | 0 | 25 | 110 | 45 | 7 | 8 | 18 | 2.3 | 250 |
| Experimental Example 40 | Alumina | 25 | 140 | 0 | 25 | 140 | 45 | 12 | 10 | 20 | 2.0 | 250 |

TABLE 4-continued

| | | | | | | | | | | | | |
|---|---|---|---|---|---|---|---|---|---|---|---|---|
| Experimental Example 41 | Alumina | 25 | 170 | 0 | 25 | 170 | 45 | 20 | 12 | 22 | 1.8 | 250 |
| Experimental Example 42 | Alumina | 25 | 110 | 0 | 25 | 170 | 45 | 7 | 8 | 18 | 2.3 | 250 |

| | Inner protective layer | | | | | Ratio of an outer protective layer to an inner protective layer | | | | |
|---|---|---|---|---|---|---|---|---|---|---|
| | | Pore diameter | | | | | | | | |
| | Porosity P2 [%] | Average R2 [μm] | D10 [μm] | D10/R2 | Thickness T2 [μm] | Porosity ratio P1/P2 | Ratio of average pore diameter R1/R2 | Ratio D90/D10 | Thickness ratio T1/T2 | Waterproofing amount [μL] |
| Experimental Example 35 | 10 | 20 | 12 | 0.6 | 250 | 0.70 | 0.40 | 1.50 | 0.20 | 18 |
| Experimental Example 36 | 16 | 22 | 14 | 0.6 | 250 | 0.75 | 0.45 | 1.43 | 0.20 | 19 |
| Experimental Example 37 | 25 | 24 | 16 | 0.7 | 250 | 0.80 | 0.50 | 1.38 | 0.20 | 22 |
| Experimental Example 38 | 25 | 24 | 16 | 0.7 | 250 | 0.28 | 0.33 | 1.13 | 0.20 | 25 |
| Experimental Example 39 | 10 | 20 | 12 | 0.6 | 50 | 0.70 | 0.40 | 1.50 | 5.00 | 16 |
| Experimental Example 40 | 16 | 22 | 14 | 0.6 | 50 | 0.75 | 0.45 | 1.43 | 5.00 | 18 |
| Experimental Example 41 | 25 | 24 | 16 | 0.7 | 50 | 0.80 | 0.50 | 1.38 | 5.00 | 20 |
| Experimental Example 42 | 25 | 24 | 16 | 0.7 | 50 | 0.28 | 0.33 | 1.13 | 5.00 | 23 |

As shown in tables 3 and 4, in all of Experimental Examples 28 to 42 in which the value of the ratio R1/R2 of the average pore diameter was less than 1.0, the waterproofing amount exceeded 10 μL, which was larger than in Experimental Examples 23 and 24 in which the value of the ratio R1/R2 exceeded 1. In other words, the waterproofing performance of the element main body 101a improved in Experimental Examples 28 to 42. The results of the Experimental Examples 28 to 34 and 39 to 42 confirmed that the waterproofing performance of the element main body 101a can be improved by adjusting the value of the ratio R1/R2 to less than 1.0 even when the thickness ratio T1/T2 is more than 1.0 and 30.0 or less. The results of Experimental Examples 35 to 42 confirmed that even when the porous protective layer 90 is formed by plasma spraying, the waterproofing performance of the element main body 101a can be improved by adjusting the value of the ratio R1/R2 to less than 1.0. The results of Experimental Examples 35, 38, 39, and 42 confirmed that the porosity P1 may be 5% or more and less than 10%. The results of Experimental Examples 35, 36, 39, and 40 confirmed that the porosity P2 may be 10% or more and less than 20%.

The present application claims priority from Japanese Patent Application No. 2016-68394, filed on Mar. 30, 2016, and Japanese Patent Application No. 2017-058596, filed on Mar. 24, 2017, the entire contents of which are incorporated herein by reference.

What is claimed is:

1. A sensor element comprising:
an element main body including an oxygen ion-conductive solid electrolyte layer;
a protective layer covering at least part of the element main body and including a porous inner protective layer and a porous outer protective layer disposed on an outer side of the inner protective layer, the outer protective layer having a smaller average pore diameter than the inner protective layer; and
a gas-to-be-measured flow portion provided within the element main body, the gas-to-be-measured flow portion comprising a gas inlet that is open to an exterior of the sensor element and at least one hollow space provided within the element main body, wherein:
the gas-to-be-measured flow portion extends in a longitudinal direction of the element main body and does not have a flow path perpendicular to the longitudinal direction of the element main body, the longitudinal direction extending along a greatest length of the element main body, and
a value of a ratio D90/D10 of a 90% pore diameter (D90) [μm] of the outer protective layer to a 10% pore diameter (D10) [μm] of the inner protective layer is 1.5 or less.

2. The sensor element according to claim 1,
wherein a value of a ratio R1/R2 of an average pore diameter R1 [μm] of the outer protective layer to an average pore diameter R2 [μm] of the inner protective layer is 0.8 or less.

3. The sensor element according to claim 2,
wherein the value of the average pore diameter ratio R1/R2 is 0.4 or less.

4. The sensor element according to claim 3,
wherein a value of a ratio T1/T2 of a thickness T1 [μm] of the outer protective layer to a thickness T2 [μm] of the inner protective layer is 30.0 or less.

5. The sensor element according to claim 2,
wherein a value of a ratio T1/T2 of a thickness T1 [μm] of the outer protective layer to a thickness T2 [μm] of the inner protective layer is 30.0 or less.

6. The sensor element according to claim 1,
wherein a value of a ratio T1/T2 of a thickness T1 [μm] of the outer protective layer to a thickness T2 [μm] of the inner protective layer is 30.0 or less.

7. The sensor element according to claim 6,
wherein the value of the ratio T1/T2 is 1.0 or less.

8. The sensor element according to claim 6,
wherein the value of the ratio T1/T2 is 0.6 or less.
9. The sensor element according to claim 1,
wherein the outer protective layer has a porosity P1 of 10% or more and 60% or less, and
the inner protective layer has a porosity P2 of 20% or more and 70% or less.
10. The sensor element according to claim 1,
wherein the outer protective layer and the inner protective layer are ceramics.
11. The sensor element according to claim 1,
wherein the protective layer includes three or more layers including the outer protective layer and the inner protective layer and being arranged to exhibit a tendency in which the average pore diameter increases from the outer protective layer toward the inner protective layer.
12. The sensor element according to claim 1, further comprising an electrode provided on an outer surface of the element main body such that the electrode is exposed to an exterior of the element main body,
wherein the protective layer covers the electrode.
13. The sensor element according to claim 1, wherein:
the protective layer includes a first portion provided on a first surface of the element main body that extends in the longitudinal direction, and
a length of the first portion of the protective layer in the longitudinal direction of the element main body is greater than or equal to a length of the gas-to-be-measured flow portion that includes the gas inlet and at least a part of the at least one hollow space.
14. The sensor element according to claim 13,
wherein the protective layer covers a portion of the element main body, the portion of the element main body including a front end surface of the element main body and extending a predetermined distance from the front end surface of the element main body.
15. The sensor element according to claim 1,
wherein D90 is 1 μm or more and 100 μm or less.
16. The sensor element according to claim 1,
wherein D10 is 1 μm or more and 50 μm or less.
17. The sensor element according to claim 1,
wherein the ratio D90/D10 is 0.13 or more and 1.5 or less.
18. The sensor element according to claim 17,
wherein the ratio D90/D10 is 0.38 or more and 1.5 or less.
19. A gas sensor comprising the sensor element according to claim 1.

* * * * *